United States Patent
Kim et al.

(10) Patent No.: US 8,885,754 B2
(45) Date of Patent: Nov. 11, 2014

(54) METHOD AND DEVICE FOR SENDING AND RECEIVING PRECODED SIGNALS ON A WIRELESS COMMUNICATION SYSTEM

(75) Inventors: Hyungtae Kim, Anyang-si (KR); Hanbyul Seo, Anyang-si (KR); Kijun Kim, Anyang-si (KR); Daewon Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 24 days.

(21) Appl. No.: 13/812,218

(22) PCT Filed: Jul. 28, 2011

(86) PCT No.: PCT/KR2011/005561
§ 371 (c)(1),
(2), (4) Date: Jan. 25, 2013

(87) PCT Pub. No.: WO2012/015252
PCT Pub. Date: Feb. 2, 2012

(65) Prior Publication Data
US 2013/0129014 A1    May 23, 2013

Related U.S. Application Data

(60) Provisional application No. 61/369,032, filed on Jul. 29, 2010.

(51) Int. Cl.
*H04B 7/02* (2006.01)
*H04L 25/03* (2006.01)
(Continued)

(52) U.S. Cl.
CPC .......... *H04B 7/0456* (2013.01); *H04L 25/0391* (2013.01); *H04B 7/0469* (2013.01);
(Continued)

(58) Field of Classification Search
CPC  H04L 25/0391; H04L 5/0007; H04B 7/0469; H04B 7/065; H04B 7/0478; H04B 7/10; H04B 7/0465; H04B 7/0639
USPC ......... 375/267, 260, 262, 265, 295, 279, 316; 370/203, 204, 205, 208, 209, 210
See application file for complete search history.

(56) References Cited

U.S. PATENT DOCUMENTS

2007/0274411 A1   11/2007   Lee et al.
2008/0049855 A1   2/2008   Duvaut et al.
(Continued)

FOREIGN PATENT DOCUMENTS

JP   2010-517463 A   5/2010
WO   2009/025493 A2   2/2009

OTHER PUBLICATIONS

International Search Report issued in corresponding International Application No. PCT/KR2011/005561 dated Mar. 28, 2012.

*Primary Examiner* — Dhaval Patel
(74) *Attorney, Agent, or Firm* — Morgan, Lewis & Bockius LLP

(57) ABSTRACT

The present invention relates to a method for transmitting a precoded signal, the method comprising: determining a precoding matrix on the basis of the first matrix, which is determined from a first codebook including precoding matrices indicated by a first precoding matrix index (PMI), and the second matrix, which is determined from a second codebook including precoding matrices indicated by a second PMI; and transmitting the precoded signal using the determined precoding matrix to the receiver, wherein each precoding matrix contained in the first codebook is comprised of a block diagonal matrix, and individual blocks of the block diagonal matrix are configured independently of each other, and each precoding matrix contained in the second codebook is comprised of an upper element and a lower element, where the lower element includes a phase rotation value.

4 Claims, 11 Drawing Sheets

(51) Int. Cl.
*H04B 7/04* (2006.01)
*H04B 7/06* (2006.01)
*H04B 7/10* (2006.01)
*H04L 5/00* (2006.01)

(52) U.S. Cl.
CPC ............... *H04B 7/0639* (2013.01); *H04B 7/10* (2013.01); *H04L 5/0007* (2013.01); *H04B 7/065* (2013.01); *H04B 7/0478* (2013.01); *H04B 7/0465* (2013.01)

USPC ........... 375/267; 375/260; 375/295; 375/299; 375/285; 375/316

(56) References Cited

U.S. PATENT DOCUMENTS

| | | |
|---|---|---|
| 2010/0067605 A1 | 3/2010 | Jongren |
| 2010/0284484 A1* | 11/2010 | Jongren et al. ............. 375/267 |
| 2011/0312332 A1* | 12/2011 | Choudhury et al. ....... 455/452.2 |

* cited by examiner (a)

(b)

METHOD AND DEVICE FOR SENDING AND RECEIVING PRECODED SIGNALS ON A WIRELESS COMMUNICATION SYSTEM

This is a U.S. National Phase Entry of PCT Application No. PCT/KR2011/005561, filed Jul. 28, 2011, and claims the benefit of U.S. Provisional Application No. 61/369,032 filed Jul. 29, 2010.

TECHNICAL FIELD

The present invention relates to a wireless communication system, and more particularly to a method and apparatus for transmitting and receiving precoded signals.

BACKGROUND ART

A Multiple Input Multiple Output (MIMO) scheme refers to a scheme for improving data transmission/reception efficiency using multiple transmit antennas and multiple receive antennas, unlike a scheme using one transmit antenna and one receive antenna. A receiver receives data through multiple paths when multiple antennas are used, whereas the receiver receives data through a single antenna path when a single antenna is used. Accordingly, MIMO can increase a data transmission rate and the amount of transmission data, and improve coverage.

In a MIMO wireless communication system, a receiver (e.g., a user equipment) may feed back a variety of feedback information (for example, a Rank Indicator (RI), a Precoding Matrix Index (PMI), and Channel Quality Information (CQI), etc.) to a transmitter (e.g., a base station). The feedback information may also be referred to as channel state information (CSI). The MS may feed back preferred PMI and RI to the BS on the basis of channel measurement result received from the BS. The MS-preferred RI corresponds to a downlink transmission rank value having the highest transfer rate on the assumption that the MS preferred RI is used by the BS in a given channel state. In addition, the MS-preferred PMI is an index indicating a precoding matrix appropriate for a channel state measured by the MS from among a codebook indicating a set or aggregate of candidate precoding matrices, and the codebook is predefined and shared between the BS and the MS. CQI is calculated on the basis of PMI/RI reported by the MS, and corresponds to a Modulation and Coding Scheme (MCS) level applied to downlink transmission. In this case, CQI may represent an MCS level providing an allowable packet error rate when a rank value and precoder information based on the MS reported PMI/RI.

DISCLOSURE

Technical Problem

A new system including an antenna configuration more extended than a legacy MIMO wireless communication system is being discussed. For example, while the legacy system supports only up to four transmission (4 Tx) antennas, the new system having an extended antenna configuration cn provide higher system capacity by supporting MIMO transmission through 8 Tx antennas.

In order to perform correct communication according to a Multiple User MIMO (MU-MIMO) scheme, a channel state feedback capable of representing a channel state more correctly than a Single User-MIMO (SU-MIMO) scheme is needed. Specifically, it is very important for a PMI feedback based on a predetermined codebook to design a plurality of precoding matrices capable of more correctly representing a channel state. For this purpose, it is possible to represent precoding information using a hierarchical codebook configured to determine one final precoding matric W on the basis of two precoding matrices (for example, W1 and W2) having different attributes indicating a channel state.

Accordingly, the present invention is directed to a method and apparatus for transmitting and receiving precoded signals in a wireless communication system that substantially obviate one or more problems due to limitations and disadvantages of the related art. An object of the present invention is to provide a method and apparatus for transmitting and receiving precoded signals using a hierarchical codebook capable of more precisely reflecting a channel state in an extended antenna configuration system.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for transmitting a precoded signal by a transmitter in a wireless communication system supporting Multiple Input Multiple Output (MIMO) transmission, the method including: determining a first matrix (W1) from a first codebook including precoding matrices indicated by a first precoding matrix index (PMI), determining a second matrix (W2) from a second codebook including precoding matrices indicated by a second PMI, and determining a precoding matrix (W) on the basis of the first matrix (W1) and the second matrix (W2); performing precoding of at least one layer mapped to a signal to be transmitted using the determined precoding matrix (W); and transmitting the precoded signal to the receiver, wherein each precoding matrix contained in the first codebook is comprised of a block diagonal matrix, and individual blocks of the block diagonal matrix are configured independently of each other, and each precoding matrix contained in the second codebook is comprised of an upper element and a lower element, where the lower element includes a phase rotation value.

In another aspect of the present invention, a method for receiving a precoded signal by a receiver in a wireless communication system supporting Multiple Input Multiple Output (MIMO) transmission includes: receiving a precoded signal obtained by precoding of at least one layer mapped to a signal transmitted from the transmitter, from the transmitter; and processing the precoded signal using a precoding matrix (W) determined on the basis of not only a first matrix (W1) from a first codebook including precoding matrices indicated by a first precoding matrix index (PMI), but also a second matrix (W2) from a second codebook including precoding matrices indicated by a second PMI, wherein each precoding matrix contained in the first codebook is comprised of a block diagonal matrix, and individual blocks of the block diagonal matrix are configured independently of each other, and each precoding matrix contained in the second codebook is comprised of an upper element and a lower element, where the lower element includes a phase rotation value.

In another aspect of the present invention, a transmitter for transmitting a precoded signal in a wireless communication system supporting Multiple Input Multiple Output (MIMO) transmission includes: a transmission (Tx) module for transmitting a signal to a receiver; a reception (Rx) module for receiving a signal from the receiver; and a processor for controlling the transmitter including the transmission (Tx) module and the reception (Rx) module, wherein the processor determines a first matrix (W1) from a first codebook including precoding matrices indicated by a first precoding matrix index (PMI), determines a second matrix (W2) from a second codebook including precoding matrices indicated by a second PMI, determines a precoding matrix (W) on the basis of the first matrix (W1) and the second matrix (W2), performs precoding of at least one layer mapped to a signal to be transmitted using the determined precoding matrix (W), and transmits the precoded signal to the receiver through the transmission (Tx) module, wherein each precoding matrix contained in the first codebook is comprised of a block diagonal matrix, and individual blocks of the block diagonal matrix are configured independently of each other, and each precoding matrix contained in the second codebook is comprised of an upper element and a lower element, where the lower element includes a phase rotation value.

In another aspect of the present invention, a receiver for receiving a precoded signal in a wireless communication system supporting Multiple Input Multiple Output (MIMO) transmission includes: a transmission (Tx) module for transmitting a signal to a transmitter; a reception (Rx) module for receiving a signal from the receiver; and a processor for controlling the receiver including the transmission (Tx) module and the reception (Rx) module, wherein the processor receives a precoded signal obtained by precoding of at least one layer mapped to a signal transmitted from the transmitter, from the transmitter through the reception (Rx) module, and processes the precoded signal using a precoding matrix (W) determined on the basis of not only a first matrix (W1) from a first codebook including precoding matrices indicated by a first precoding matrix index (PMI), but also a second matrix (W2) from a second codebook including precoding matrices indicated by a second PMI, wherein each precoding matrix contained in the first codebook is comprised of a block diagonal matrix, and individual blocks of the block diagonal matrix are configured independently of each other, and each precoding matrix contained in the second codebook is comprised of an upper element and a lower element, where the lower element includes a phase rotation value.

The following contents can be commonly applied to the above-mentioned embodiments.

An i-th precoding matrix W1 (i) from among precoding matrices contained in the first codebook and a j-th precoding matrix W2(j) from among precoding matrices contained in the second codebook are represented by the following equation:

$$W1(i) = \begin{bmatrix} X_i & 0 \\ 0 & Y_i \end{bmatrix}$$ [Equation]

$$W2(j) = \begin{bmatrix} e_M^k & e_M^l & \cdots & e_M^n \\ \alpha_j e_M^k & \beta_j e_M^l & \cdots & \gamma_j e_M^n \end{bmatrix}$$

where W1 (i) is a (Nt×2M)-sized block diagonal matrix, $X_i$ and $Y_i$ are individual blocks of the block diagonal matrix, each of $X_i$ and $Y_i$ is (Nt/2)×M-sized matrix, and Nt is the number of transmission antennas of the transmitter, and W2(j) is a (2M×r)-sized matrix, r is the number of the layers, $e_M^p$ (p=k, l, . . . , n) is a (M×1)-sized vector, a p-th component from among M vector components of $e_M^p$ is set to 1, the remaining components other than the p-th component are set to '0', $e_M^k, e_M^l, \ldots, e_M^n$ denote the upper elements, $\alpha_j e_M^k, \beta_j e_M^l, \ldots, \gamma_j e_M^n$ denote the lower elements, and $\alpha_j, \beta_j, \gamma_j$ denote the phase rotation values, where k,l,n are 1≤k,l,n≤M, and k, l, and n are integers, respectively.

An i-th precoding matrix W1(i) from among precoding matrices contained in the first codebook and a j-th precoding matrix W2(j) from among precoding matrices contained in the second codebook are represented by the following equation:

$$W1(i) = \begin{bmatrix} X_i & 0 \\ 0 & X_i \end{bmatrix}$$ [Equation]

$$W2(j) = \begin{bmatrix} e_M^{k1} & e_M^{l1} & \cdots & e_M^{n1} \\ \alpha_j e_M^{k2} & \beta_j e_M^{l2} & \cdots & \gamma_j e_M^{n2} \end{bmatrix}$$

where W1(i) is a (Nt×2M)-sized block diagonal matrix, $X_i$ corresponds to each block of the block diagonal matrix, $X_i$ is a (Nt/2)×M-sized matrix, and Nt is the number of transmission antennas of the transmitter, and W2(j) is a (2M×r)-sized matrix, r is the number of the layers, $e_M^p$ (p=k1, k2, l1, l2, . . . , n1, n2) is a (M×1)-sized vector, a p-th component from among M vector components of $e_M^p$ is set to 1, the remaining components other than the p-th component are set to '0', $e_M^{k1}, e_M^{l1}, \ldots, e_M^{n1}$ denote the upper elements, $\alpha_j e_M^{k2}, \beta_j e_M^{l2}, \ldots, \gamma_j e_M^{n2}$ denote the lower elements, $\alpha_j, \beta_j, \gamma_j$ denote the phase rotation values, where k1, k2, l1, l2, n1, n2 are denoted by 1≤k1, k2, l1, l2, n1, n2≤M, and k1, k2, l1, l2, n1, n2 are integers, respectively.

An i-th precoding matrix W1(i) from among precoding matrices contained in the first codebook and a j-th precoding matrix W2(j) from among precoding matrices contained in the second codebook are represented by the following equation:

$$W1(i) = \begin{bmatrix} X_i & 0 \\ 0 & Y_i \end{bmatrix}$$ [Equation]

$$W2(j) = \begin{bmatrix} e_M^{k1} & e_M^{l1} & \cdots & e_M^{n1} \\ \alpha_j e_M^{k2} & \beta_j e_M^{l2} & \cdots & \gamma_j e_M^{n2} \end{bmatrix}$$

where W1(i) is a (Nt×2M)-sized block diagonal matrix, $X_i$ and $Y_i$ are individual blocks of the block diagonal matrix, each of $X_i$ and $Y_i$ is (Nt/2)×M-sized matrix, and Nt is the number of transmission antennas of the transmitter, and W2(j) is a (2M×r)-sized matrix, r is the number of the layers, $e_M^p$ (p=k1, k2, l1, l2, . . . , n1, n2) is a (M×1)-sized vector, a p-th component from among M vector components of $e_M^p$ is set to 1, the remaining components other than the p-th component are set to '0', $e_M^{k1}, e_M^{l1}, \ldots, e_M^{n1}$ denote the upper elements, $\alpha_j e_M^{k2}, \beta_j e_M^{l2}, \ldots, \gamma_j e_M^{n2}$ denote the lower elements, and $\alpha_j, \beta_j, \gamma_j$ denote the phase rotation values, where k1, k2, l1, l2, n1, n2 are denoted by 1≤k1, k2, l1, l2, n1, n2≤M, and k1, k2, l1, l2, n1, n2 are integers, respectively.

An i-th precoding matrix W1(i) from among precoding matrices contained in the first codebook and a j-th precoding matrix W2(j) from among precoding matrices contained in the second codebook are represented by the following equation:

$$W1(i) = \begin{bmatrix} X_i & 0 \\ 0 & X_i \end{bmatrix}$$ [Equation]

$$W2(j) = \begin{bmatrix} \tilde{e}_M^k & \tilde{e}_M^l & \cdots & \tilde{e}_M^n \\ \alpha_j \tilde{e}_M^k & \beta_j \tilde{e}_M^l & \cdots & \gamma_j \tilde{e}_M^n \end{bmatrix}$$

where $W1(i)$ is a (Nt×2M)-sized block diagonal matrix, $X_i$ corresponds to each block of the block diagonal matrix, $X_i$ is a (Nt/2)×M-sized matrix, and Nt is the number of transmission antennas of the transmitter, and $W2(j)$ is a (2M×r)-sized matrix, r is the number of the layers, $\tilde{e}_M^p$ (p=k, l, ..., n) is a (M×1)-sized vector and a coefficient configured to construct a linear combination of column vectors of the block $X_i$, $\tilde{e}_M^k$, $\tilde{e}_M^l$, ..., $\tilde{e}_M^n$ denote the upper elements, $\alpha_j \tilde{e}_M^k$, $\beta_j \tilde{e}_M^l$, ..., $\gamma_j \tilde{e}_M^n$ denote the lower elements, $\alpha_j$, $\beta_j$, $\gamma_j$ denote the phase rotation values, and k, l, n are integers, respectively.

$\tilde{e}_M^p$ is denoted by $\tilde{e}_M^p = [c_1\ c_2\ c_3\ c_4]^T$, where $c_1, c_2, c_3$, or $c_4$ is a complex number, and W is represented by the following equation:

$$W = \begin{bmatrix} \sum_{n=1}^{4} c_n X_i(n) & \alpha_j \sum_{n=1}^{4} c_n X_i(n) \end{bmatrix}^T$$ [Equation]

It is to be understood that both the foregoing general description and the following detailed description of the present invention are exemplary and explanatory and are intended to provide further explanation of the invention as claimed.

Advantageous Effects

Exemplary embodiments of the present invention have the following effects. The embodiments of the present invention can provide a method and apparatus for transmitting and receiving precoded signals using an efficient hierarchical codebook capable of more correctly reflecting a channel state in an extended antenna configuration system.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
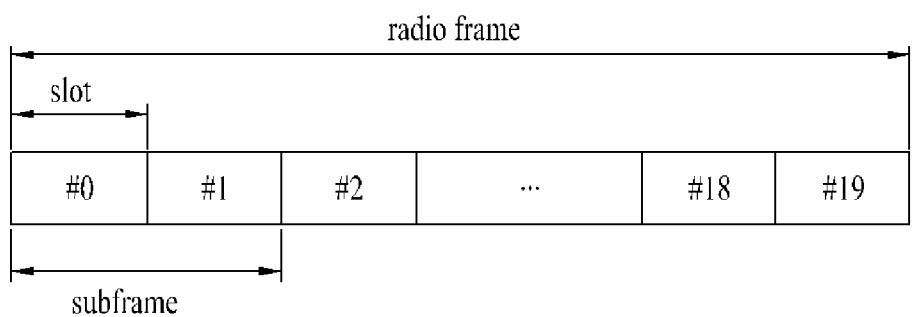
FIG. 1 is a diagram showing the structure of a type 1 radio frame.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point (AP) as necessary. In addition, the term "Base Station (BS)" may include the concept of a cell or sector. For example, the term "serving base station" may be referred to as a serving cell and may also be referred to as a cooperative cell. The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3rd Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and 3GPP LTE-A system. However, technical features of the present invention are not limited thereto.

A downlink (DL) radio frame structure will hereinafter be described with reference to FIGS. 1 and 2.

In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplexing (TDD).

FIG. 1 is a diagram showing the structure of the type 1 radio frame. A downlink radio frame includes 10 subframes, and one subframe includes two slots in a time region. A time required for transmitting one subframe is defined in a Transmission Time Interval (TTI). For example, one subframe may have a length of 1 ms and one slot may have a length of 0.5 ms. One slot may include a plurality of OFDM symbols in a time domain and include a plurality of Resource Blocks (RBs) in a frequency domain.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If the channel state is unstable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

Figure 2:
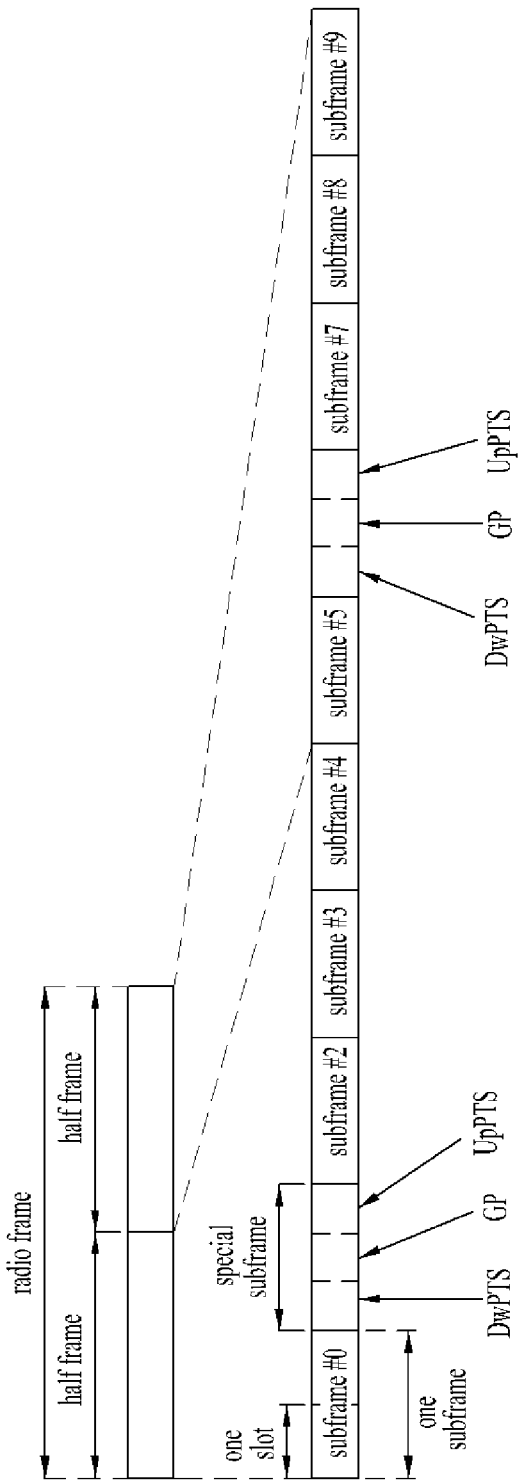
FIG. 2 is a diagram showing the structure of a type 2 radio frame.

The structure of a type 2 radio frame is shown in FIG. 2. The type 2 radio frame includes two half-frames, each of which is made up of five subframes. Subframes may be classified into normal subframe and special subframes. A special subframe includes 3 fields, i.e., Downlink Pilot Time Slot (DwPTS), Gap Period (GP), and Uplink Pilot Tile Slot (UpPTS) fields. Although the lengths of these three fields may be individually set, the total length of the three fields should be 1 ms. One subframe includes 2 slots. That is, one subframe includes 2 slots, regardless of the type of the radio frame.

The structure of the radio frame is only exemplary. Accordingly, the number of subframes included in the radio frame, the number of slots included in the subframe or the number of symbols included in the slot may be changed in various manners.

Figure 3:
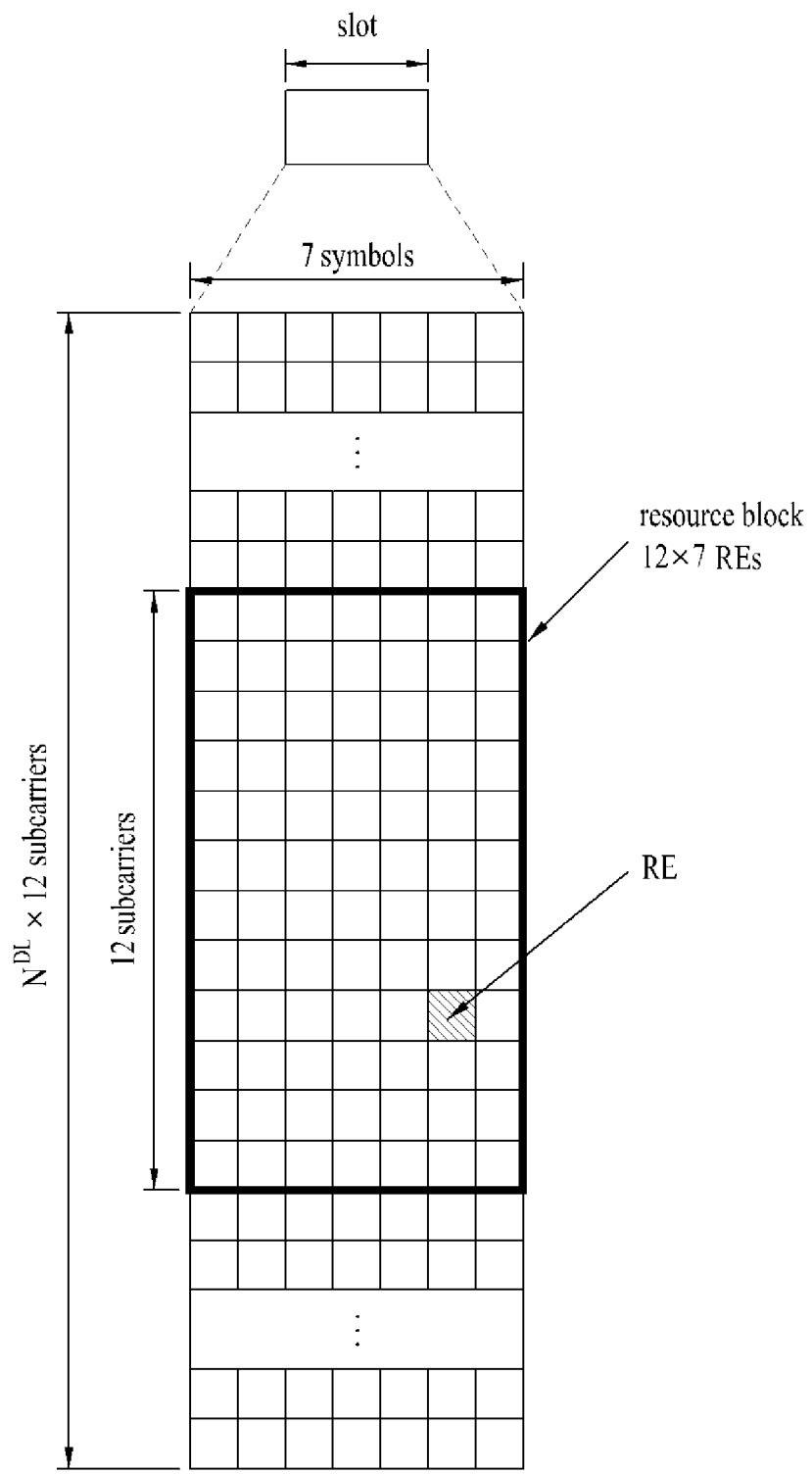
FIG. 3 exemplarily shows a resource grid of a single downlink (DL) slot.

FIG. 3 is a diagram showing an example of a resource grid in one downlink slot. OFDM symbols are configured by the normal CP. Referring to FIG. 3, the downlink slot includes a plurality of OFDM symbols in a time region and includes a plurality of RBs in a frequency region. Although one downlink slot includes seven OFDM symbols and one RB includes 12 subcarriers, the present invention is not limited thereto. Each element of the resource grid is referred to as a Resource Element (RE). For example, a RE a(k,l) is located at a k-th subcarrier and an l-th OFDM symbol. In case of the normal CP, one RB includes 12×7 REs (in case of the extended CP, one RB includes 12×6 REs). Since a distance between subcarriers is 15 kHz, one RB includes about 180 kHz in the frequency region. $N^{DL}$ denotes the number of RBs included in the downlink slot. The $N^{DL}$ is determined based on downlink transmission bandwidth set by scheduling of a base station (BS).

Figure 4:
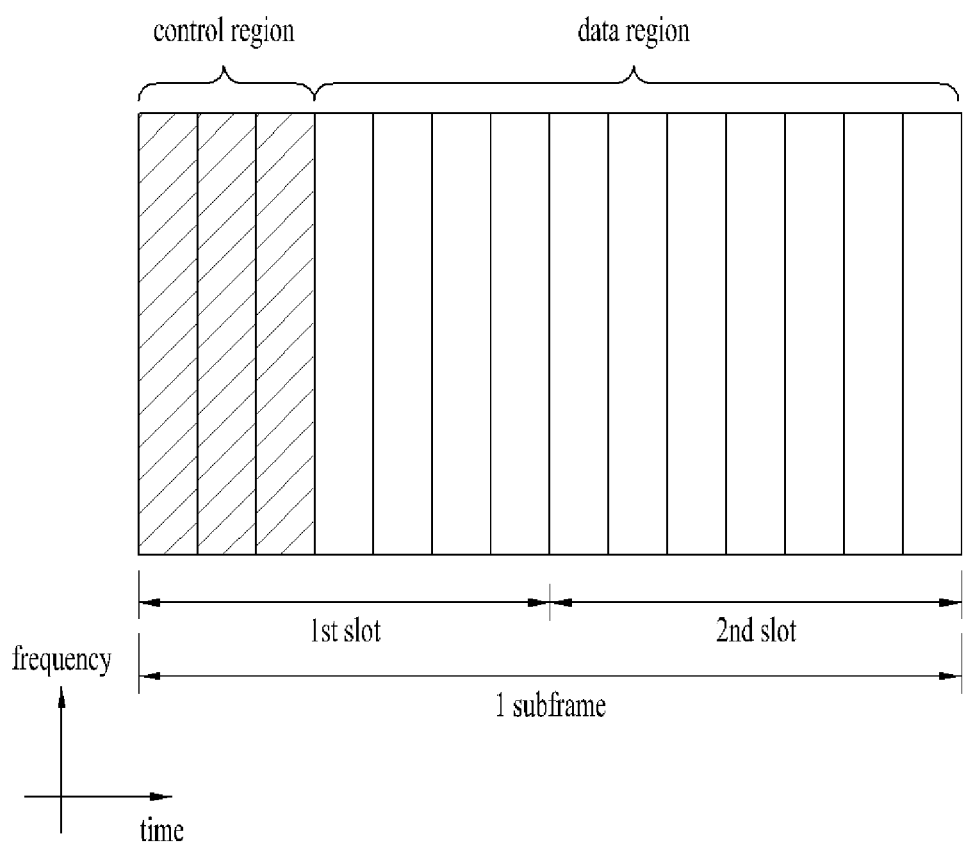
FIG. 4 is a diagram showing the structure of a downlink subframe.

FIG. 4 is a diagram showing the structure of a downlink subframe. Up to the first 3 OFDM symbols (i.e., the first OFDM symbol, the first 2 OFDM symbols, or the first 3 OFDM symbols) of a first slot within one subframe correspond to a control region to which a control channel is allocated. The remaining OFDM symbols correspond to a data region to which a Physical Downlink Shared Channel (PDSCH) is allocated. The basic unit of transmission becomes one subframe. That is, a PDCCH and a PDSCH are allocated to two slots. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response of uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of an higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
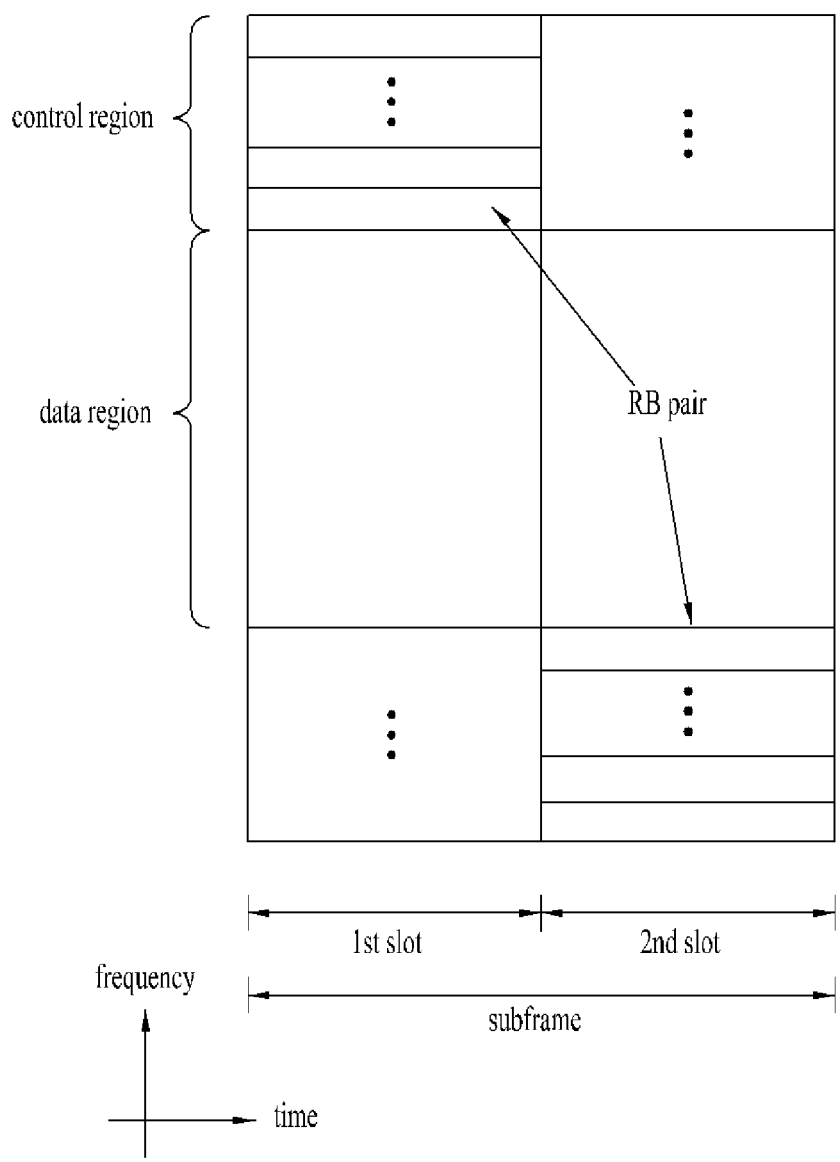
FIG. 5 is a diagram showing the structure of an uplink frame.

FIG. 5 is a diagram showing the structure of an uplink frame. The uplink subframe may be divided into a control region and a data region in a frequency region. A Physical Uplink Control Channel (PUCCH) including uplink control information is allocated to the control region. A Physical uplink Shared Channel (PUSCH) including user data is allocated to the data region. The PUCCH have three main purposes, transmission of an ACK/NACK for the PDSCH, transmission of a Channel Quality Indicator (CQI) for frequency domain scheduling of the PDSCH, and PUSCH transmission resource request (scheduling request). CQI information bits may include one or more fields. For example, the CQI information bits may include a CQI field indicating a CQI index for determining a Modulation and Coding Scheme (MCS), a Precoding Matrix Indictor (PMI) field indicating the index of a precoding matrix in a codebook, and a Rank Indicator (RI) indicating the rank.

In order to maintain single carrier characteristics, one UE does not simultaneously transmit the PUCCH and the PUSCH. The PUCCH for one UE is allocated to a RB pair in a subframe. RBs belonging to the RB pair occupy different subcarriers with respect to two slots. Thus, the RB pair allocated to the PUCCH is "frequency-hopped" at a slot edge.

Multi-Input Multi-Output (MIMO) System

Figure 6:
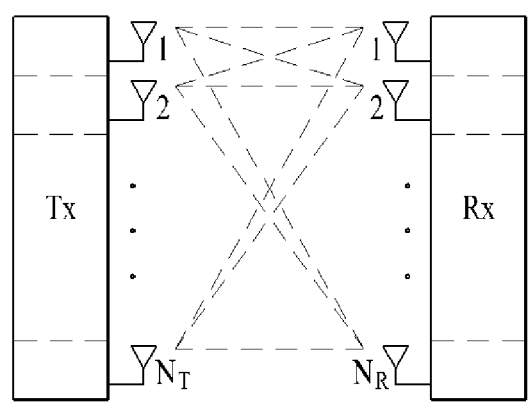
FIG. 6 is a diagram showing the configuration of a wireless communication system having multiple antennas.
Figure 6:
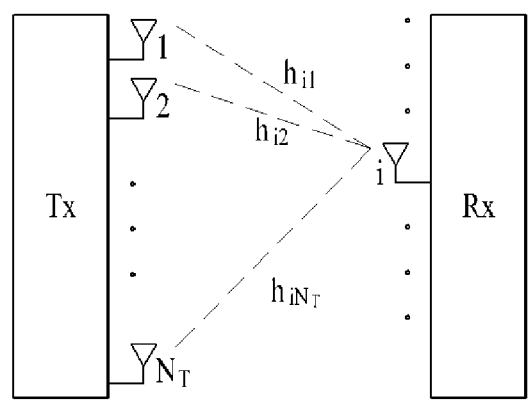

FIG. 6 is a diagram showing the configuration of a wireless communication system having multiple antennas. As shown in FIG. 6(a), if the number of transmit antennas is increased to $N_T$ and the number of receive antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate $R_0$ upon utilization of a single antenna and a rate increase ratio $R_i$.

$$R_i = \min(N_T, N_R) \qquad \text{[Equation 1]}$$

For example, in an MIMO system using four transmit antennas and four receive antennas, it is possible to theoretically acquire a transfer rate which is four times that of a single antenna system. After the increase in the theoretical capacity of the MIMO system was proved in the mid-1990s, various technologies of substantially improving a data transfer rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. In the above system, it is assumed that $N_T$ transmit antennas and $N_R$ receive antennas are present.

In transmitted signals, if the $N_T$ transmit antennas are present, the number of pieces of maximally transmittable information is $N_T$. The transmitted information may be expressed as follows.

$$s = [s_1, s_2, \ldots, s_{N_T}]^T \qquad \text{[Equation 2]}$$

The transmitted information $s_1, s_2, \ldots, s_{N_T}$ may have different transmit powers. If the respective transmit powers are $P_1, P_2, \ldots, P_{N_T}$, the transmitted information with adjusted powers may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In addition, $\hat{S}$ may be expressed using a diagonal matrix P of the transmit powers as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Considers that the $N_T$ actually transmitted signals $x_1, x_2, \ldots, x_{N_T}$ are configured by applying a weight matrix W to the information vector $\hat{S}$ with the adjusted transmit powers. The weight matrix W serves to appropriately distribute the transmitted information to each antenna according to a transport channel state, etc. $x_1, x_2, \ldots, x_{N_T}$ may be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} \qquad \text{[Equation 5]}$$

$$= W\hat{s} = WPs$$

In Equation 5, $W_{ij}$ denotes a weight between an i-th transmit antenna and j-th information. W is also called a precoding matrix.

If the $N_R$ receive antennas are present, respective received signals $y_1, y_2, \ldots, y_{N_R}$ of the antennas are expressed as follows.

$$y = [y_1, y_2, \ldots, y_{N_R}]^T \qquad \text{[Equation 6]}$$

If channels are modeled in the MIMO radio communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 6(b) is a diagram showing channels from the $N_T$ transmit antennas to the receive antenna i. The channels may be combined and expressed in the form of a vector and a matrix. In FIG. 6(b), the channels from the $N_T$ transmit antennas to the receive antenna i may be expressed as follows.

$$h_i^T = [h_{i1}, h_{i2}, \ldots, h_{iN_T}] \quad \text{[Equation 7]}$$

Accordingly, all the channels from the $N_T$ transmit antennas to the $N_R$ receive antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

An Additive White Gaussian Noise (AWGN) is added to the actual channels after a channel matrix H. The AWGN $n_1$, $n_2$, ..., $n_{N_R}$ added to the $N_T$ transmit antennas may be expressed as follows.

$$n = [n_1, n_2, \ldots, n_{N_R}]_T \quad \text{[Equation 9]}$$

Through the above-described mathematical modeling, the received signals may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} \quad \text{[Equation 10]}$$

$$= Hx + n$$

The number of rows and columns of the channel matrix H indicating the channel state is determined by the number of transmit and receive antennas. The number of rows of the channel matrix H is equal to the number $N_R$ of receive antennas and the number of columns thereof is equal to the number $N_T$ of transmit antennas. That is, the channel matrix H is an $N_R \times N_T$ matrix.

The rank of the matrix is defined by the smaller of the number of rows or columns, which are independent of each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

When the matrix is subjected to Eigen value decomposition, the rank may be defined as the number of Eigen values excluding 0. Similarly, the rank may also be defined as the number of singular values excluding 0 when the matrix is subjected to singular value decomposition. Accordingly, the physical meaning of the rank in the channel matrix may be considered the maximum number of different pieces of information that can be transmitted in a given channel.

In the description of this disclosure, the 'rank' of MIMO transmission indicates the number of paths through which a signal can be independently transmitted at a specific time and a specific frequency resource and the 'number of layers' indicates the number of signal streams transmitted through the paths. Generally, since the transmission end transmits a number of layers corresponding to the rank number used for signal transmission, the rank has the same meaning as the number of layers unless specifically stated otherwise.

CSI (Channel Status Information) Feedback

MIMO schemes are classified into an open-loop MIMO scheme and a closed-loop MIMO scheme. The open-loop MIMO scheme means that a transmitter performs MIMO transmission without receiving CSI feedback information from a MIMO receiver. The closed-loop MIMO scheme means that a transmitter receives CSI feedback information from the MIMO receiver and performs MIMO transmission. In accordance with the closed-loop MIMO scheme, each of a transmitter and a receiver can perform beamforming on the basis of CSI so as to obtain a multiplexing gain of a MIMO transmission antenna. The transmitter (for example, BS) can allocate an uplink control channel or an uplink shared channel to a receiver (for example, a user equipment) in such a manner that the receiver can feed back the CSI.

The feedback CSI may include a rank indicator (RI), a precoding matrix index (PMI), and a channel quality indicator (CQI).

RI is information of a channel rank. The channel rank means a maximum number of layers (or streams) via which different information can be transmitted through the same time-frequency resources.

Since a rank value is determined depending on long-term fading of a channel, the rank value is generally fed back for a longer period than PMI and CQI. That is, the rank value can be fed back less frequently than PMI and CQI.

PMI is information regarding a precoding matrix used for data transmission from the transmitter, and includes spatial characteristics of a channel. Precoding means that a transmit layer is mapped to a transmit antenna, and the layer-antenna mapping relationship can be determined by precoding matrices. PMI corresponds to a UE-preferred precoding matrix index of a BS on the basis of metric data such as Signal-to-Interference plus Noise Ratio (SINR). In order to reduce feedback overhead of the precoding information, a transmitter and a receiver may share a variety of precoding matrices in advance, and only indices indicating a specific precoding matrix from among the corresponding codebook can be fed back.

Figure 7:
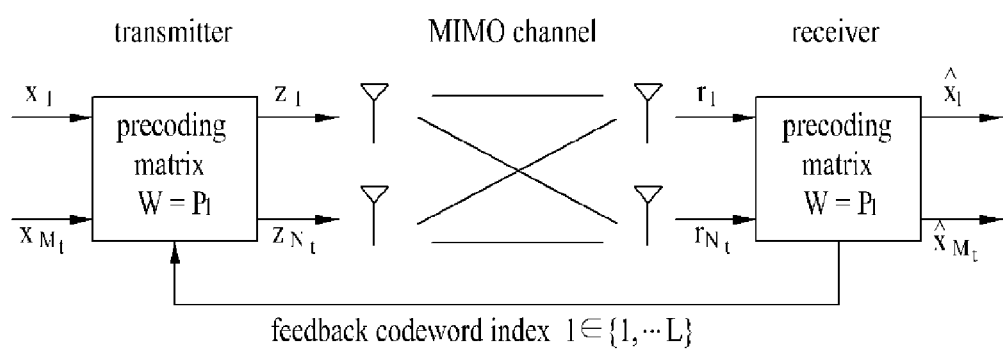
FIG. 7 is a conceptual diagram illustrating codebook-based precoding.

A codebook-based precoding scheme will hereinafter be described with reference to FIG. 7. In accordance with the codebook-based precoding scheme, the transmitter and the receiver can share codebook information including a predetermined number of precoding matrices according to a transmission rank, the number of antennas, etc. In other words, if feedback information is finite, the precoding based codebook scheme may be used. In this case, precoding matrices contained in the codebook may predetermine precoding matrices obtained by channel status quantization. As more precise quantization is performed, a precoding matrix that is capable of more correctly reflecting an actual channel state can be determined. In contrast, if the codebook is excessively increased in size, the amount of feedback overhead also increases, such that a proper-sized codebook can be designed.

A receiver measures a channel state through a reception (Rx) signal, such that it can feed back a finite number of precoding matrix information (i.e., an index of the corresponding precoding matrix) to a transmitter on the basis of the aforementioned codebook information. For example, the receiver can measure a reception (Rx) signal using a Maximum Likelihood (ML) or Minimum Mean Square Error (MMSE) scheme, such that it can select an optimum precoding matrix on the basis of the measured result. Although the receiver transmits precoding matrix information for each codeword to the transmitter as shown in FIG. 7, the scope or spirit of the present invention is not limited thereto.

The transmitter having received feedback information from the receiver can select a specific precoding matrix from the codebook on the basis of the received information. In this case, the transmitter can select a precoding matrix to be applied to MIMO transmission in consideration of the precoding matrix index fed back from the receiver. In this case, the precoding information fed back from the receiver indicates precoding information preferred by the receiver, it is not always necessary for the receiver to use a precoding matrix indicated by the precoding matrix index fed back from the receiver, and the transmitter may select an appropriate precoding matrix. The transmitter having selected the precoding matrix performs precoding by multiplying the selected precoding matrix by a predetermined number of layer signals corresponding to a transmission rank, and the transmitter can transmit the precoded transmission signal through a plurality of antennas. The transmitter may inform the receiver of precoding information applied to the transmission signal.

The receiver having received the precoded transmission signal from the transmitter may recover a reception (Rx) signal through inverse precoding by the transmitter. Generally, the precoding matrix satisfies a unitary matrix U such as $U*U^H=I$. The inverse precoding may be achieved by multiplexing a reception signal by a Hermit matrix ($P^H$) of the precoding matrix for precoding of the transmitter.

CQI is information indicating a channel quality or channel strength. CQI may be represented by a combination of predetermined MCSs. That is, a feedback CQI index may indicate a modulation scheme and a code rate. Generally, a reception SINR capable of being obtained when the BS constructs a spatial channel using a PMI is applied to CQI.

In association with CQI measurement, the UE can calculate a channel state or a valid SINR using a reference signal. In addition, the channel state or valid SINR may be measured on the entire system bandwidth (also called a set S), or may be measured on some bandwidths (specific subband or specific RB). CQI for the entire system bandwidth (Set S) may be referred to as a wideband (WB) CQI, and CQI for some bandwidths may be referred to as a subband (SB) CQI. The UE may calculate the highest MCS on the basis of the calculated channel status or valid SINR. The highest MCS is an MCS that satisfies assumption of CQI calculation without exceeding a transmission block error rate of 10% during the decoding. The UE decides a CQI index associated with the calculated MCS, and reports the decided CQI index to the BS.

In addition, a method for reporting channel information is classified into a periodic reporting scheme for periodically reporting channel information and an aperiodic reporting scheme for reporting channel information upon receiving a request from the BS.

The aperiodic reporting scheme is established for each UE by a 1-bit CQI request bit contained in UL scheduling information downloaded from the BS to the UE. If each UE receives the 1-bit CQI request bit, channel information considering a UE transmission mode can be transferred to a physical uplink shared channel (PUSCH). It may be determined that RI and CQI/PMI are not transmitted on the same PUSCH.

In case of the periodic reporting scheme, not only a period during which channel information is transmitted through a higher layer signal, but also an offset for use in the corresponding period is signaled to each UE on a subframe basis. Channel information considering a transmission mode for each UE may be transferred to the BS through a PUSCH according to a predetermined period. If several uplink transmission data pieces are simultaneously present in the subframe in which channel information is transmitted according to a predetermined period, the corresponding channel information as well as data can be transmitted through a PUSCH but not a PUCCH. In case of the periodic reporting scheme through a PUCCH, a limited number of bits may be used as compared to the periodic reporting scheme through a PUSCH. RI and CQI/PMI may be transmitted on the same PUSCH. If the periodic reporting and the aperiodic reporting collide with each other within the same subframe, only the aperiodic reporting can be carried out.

Codebook Design

The extended antenna configuration supporting system (for example, LTE-A system) can obtain additional multi-user diversity using a MU-MIMO scheme. In case of the MU-MIMO scheme, there is an interference channel between UEs multiplexed in an antenna domain, so that there is needed a method for preventing interference from occurring in other UEs under the condition that the BS performs DL transmission using channel status information (CSI) fed back from one UE from among multiple UEs. Therefore, in order to correctly perform the MU-MIMO operation, it is necessary to feed back higher-accuracy CSI than the SU-MIMO scheme.

In order to measure/report more accurate CSI, a new CSI feedback method for improving a CSI composed of RI, PMI and CQI can be used. For example, the precoding information fed back from the receiver may be indicated by a combination of two PMIs. One PMI (first PMI) from among two PMIs has long-term and/or wideband attributes, and may be denoted by W1. The other PMI (second PMI) from among two PMIs has short-term and/or subband attributes, and may be denoted by W2. The final PMI can be determined by a combination (or function) of W1 and W2. For example, assuming that the final PMI is W, W may be defined as W=W1*W2 or W=W2*W1.

In this case, W1 is frequency- and/or time-average characteristics of a channel. In other words, W1 may reflect long-term channel characteristics on a time domain, may reflect wideband (WB) channel characteristics on a frequency domain, or may be defined as CSI in which long-term channel characteristics on a time domain and WB channel characteristics on a frequency domain are reflected. In order to briefly represent such W1 characteristics, W1 may be referred to as CSI (or long-term and WB PMI) having long-term and WB attributes.

Meanwhile, W2 reflects relatively instantaneous channel characteristics as compared to W1. In other words, W1 may reflect short-term channel characteristics on a time domain, may reflect subband channel characteristics on a frequency domain, or may be defined as CSI in which short-term channel characteristics on a time domain and subband channel characteristics on a frequency domain are reflected. In order to briefly represent such W2 characteristics, W1 may be referred to as CSI (or short-term and subband PMI) having short-term and subband attributes.

In order to determine one final precoding matrix (W) from among two different attributes (for example, W1 and W2), it is necessary to construct a separate codebook (that is, a first codebook for W1 and a second code book for W2) composed of a plurality of precoding matrices indicating channel information of individual attributes. The above-mentioned codebook may be referred to as a hierarchical codebook. In this case, decoding a codebook to be finally used using the hierarchical codebook may be referred to as hierarchical codebook transformation.

As an example of hierarchical codebook transformation, a codebook can be transformed using a long-term covariance matrix of the channel as shown in the following equation 12.

$$W = \text{norm}(W1\,W2) \quad \text{[Equation 12]}$$

In Equation 12, W1 (long-term WB PMI) is a constituent element (i.e., codeword) of a codebook (for example, a first codebook) for reflecting channel information of long-term WB attributes. That is, W1 is a precoding matrix contained in the first codebook configured to reflect channel information of long-term WB attributes. Meanwhile, W2 (short-term Sb PMI) is a codeword for constructing a codebook (for example, a second codebook) configured to reflect channel information of short-term SB attributes. That is, W2 is a precoding matrix contained in the second codebook in which channel information of short-term SB attributes is reflected. W is a codeword of the finally transformed codebook. norm (A) is a normalization matrix in which a norm for each column of the matrix A is normalized to 1.

For example, W1 and W2 may be designed by the following equation 13.

$$W1(i) = \begin{bmatrix} X_i & 0 \\ 0 & X_i \end{bmatrix} \quad \text{[Equation 13]}$$

$$W2(j) = \overbrace{\begin{bmatrix} e_M^k & e_M^l & \cdots & e_M^m \\ \alpha_j e_M^k & \beta_j e_M^l & \cdots & \gamma_j e_M^m \end{bmatrix}}^{r\ \text{columns}} (\text{if rank} = r)$$

In Equation 13, W1 may be defined as a block diagonal matrix, respective blocks are the same matrices, and one block ($X_i$) may be defined as (Nt/2)×M-sized matrix. In Equation 13, Nt is the number of Tx antennas. In case of W2, $e_M^p$ (p=k, l, . . . , m) is a (M×1)-sized vector. A p-th component from among M vector components is denoted by 1, and the remaining components are zero vectors. If $e_M^p$ is multiplied by W1, a p-th column from among W1 columns is selected, so that this vector may be referred to as a selection vector. In this case, the higher the M value, the higher the number of vectors capable of being fed back at one time to represent a long-term WB channel, resulting in increased feedback accuracy. However, as the M value increases, the size of the codebook W1 that is fed back at a low frequency is gradually reduced, and the size of the codebook W2 that is fed back at a high frequency is gradually increased, resulting in increased feedback overhead. That is, there is a tradeoff between feedback overhead and feedback accuracy. Therefore, the M value can be determined in such a manner that suitable feedback accuracy is maintained and feedback overhead is not excessively increased. In case of W2, $\alpha_j$, $\beta_j$, and $\gamma_j$ denote predetermined phase values, respectively. In Equation 13, k,l,m may be 1≤k,l,m≤M, where k, l, and m are integers, respectively.

Figure 8:
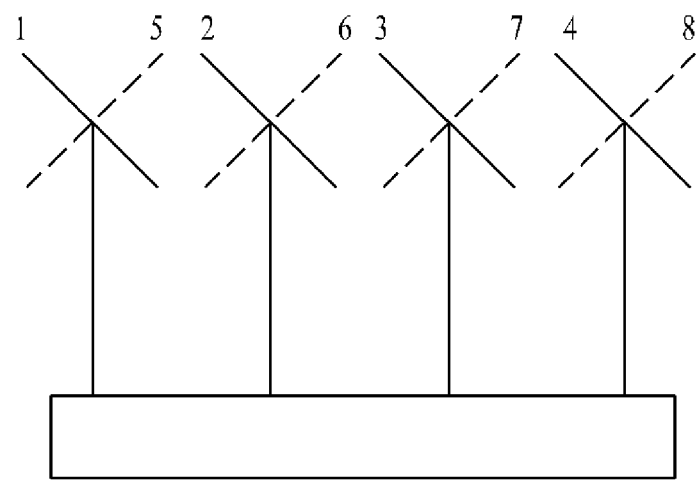
FIGS. 8 and 9 are conceptual diagrams illustrating 8Tx cross-polarity antenna configuration.

The codebook structure shown in Equation 13 is designed to sufficiently reflect channel correlation characteristics generated when cross-polarized (X-pol) antenna configuration is used and at the same time spacing between antennas is very short (typically, the spacing between contiguous antennas is equal to or shorter than a half of a signal wavelength). FIG. 8 shows an example of the 8Tx cross-polarized (X-pol) antenna configuration. As can be seen from FIG. 8, the 8Tx cross-polarized (X-pol) antenna may be composed of an antenna group having two orthogonal polarities, antennas (antennas 1, 2, 3, 4) of the antenna group 1 have the same polarities (for example, vertical polarization), and antennas (antennas 5, 6, 7, 8) of the antenna group 2 have the same polarity (for example, horizontal polarization). In addition, two antenna groups may be co-located. For example, antenna 1 and antenna 5 may be co-located, antenna 2 and antenna 6 may be co-located, antenna 3 and antenna 7 may be co-located, and antenna 2 and antenna 8 may be co-located. In other words, antennas contained in one antenna group may have the same polarities as those of Uniform Linear Array (ULA), and correlation between antennas contained in one antenna group has linear phase increment characteristics. In addition, correlation between antenna groups has phase rotation characteristics.

The codebook is a channel-quantized value, such that there is a need for a codebook to be designed through reflection of actual channel characteristics. In order to reflect actual channel characteristics into a codeword of the codebook of Equation 13, Rank 1 codebook will hereinafter be described as an example. As can be seen from Equation 14, the final codeword (W) is determined by a product of W1 and W2 in case of Rank 1.

$$W1(i) * W2(j) = \begin{bmatrix} X_i(k) \\ \alpha_j X_i(k) \end{bmatrix} \quad \text{[Equation 14]}$$

In Equation 14, the final codeword is denoted by (Nt×1) vector, and is composed of a higher vector $X_i$(k) and a lower vector $\alpha_j X_i$(k). The higher vector $X_i$(k) denotes correlation characteristics of a horizontal polarity antenna group of the cross-polarized antenna, and the lower vector $\alpha_j X_i$(k) denotes correlation characteristics of a vertical polarity antenna group. Preferably, $X_i$(k) may be denoted by a vector (for example, a DFT matrix) having linear phase increment by reflecting correlation characteristics between antennas of each antenna group.

Codebook Design supporting Various Antenna Configurations

In the case of constructing a hierarchical codebook using W1 and W2 as described above, a higher vector ($X_i$) of the final codeword (W1*W2) denotes correlation characteristics of a single antenna group, and a lower vector ($\alpha_j X_i$) denotes correlation characteristics of other antenna groups. If correlation is present in one antenna group as described above (for example, if phase linearly increases), the above-mentioned codebook structure may correctly reflect channel characteristics. However, if there is low or no correlation between antennas (for example, if there are independent channel characteristics between antenna groups), it is difficult to reflect correct channel characteristics. The embodiment of the present invention provides a codebook structure capable of reflecting correct channel characteristics according to various antenna configurations.

The codebook structures of W1 and W2 and exemplary detailed codebooks will hereinafter be described. In case of the codebooks W1 and W2 of the present invention, an i-th codeword W1(i) of the codebook W1 and a j-th codeword W2(j) of the codebook W2 can be defined by the following equation 15.

$$W1(i) = \begin{bmatrix} X_i & 0 \\ 0 & Y_i \end{bmatrix} \quad \text{[Equation 15]}$$

$$W2(j) = \overbrace{\begin{bmatrix} e_M^k & e_M^l & \cdots & e_M^n \\ \alpha_j e_M^k & \beta_j e_M^l & \cdots & \gamma_j e_M^n \end{bmatrix}}^{r\ columns} (\text{if rank} = r)$$

In Equation 15, W1 may be defined as a block diagonal matrix. In this case, a diagonal term of the block diagonal matrix may be composed of independent matrices $X_i$ and $Y_i$. The independent matrices ($X_i$ and $Y_i$) indicate that no correlation exists between the matrices ($X_i$ and $Y_i$), so that $X_i$ and $Y_i$ may be the same or different matrices. Each of $X_i$ and $Y_i$ may be defined as (Nt/2)×M-sized matrix (where Nt is the number of Tx antennas). W2 is defined as (2M×r)-sized matrix, and r is a transmission rank value (i.e., the number of layers). In case of W2, $e_M^p$ (p=k, l, ..., n) is a (M×1)-sized vector. A p-th component from among M vector components is denoted by 1, and the remaining components are zero vectors. If $e_M^p$ is multiplied by W1, a p-th column from among W1 columns is selected, so that this vector may be referred to as a selection vector. In case of W2, $\alpha^j$, $\beta_j$, $\beta_j$, $\beta_j$, and $\gamma_j$ denote predetermined phase values, respectively. In Equation 13, k,l,n may be 1≤k,l,n≤M, where k, l, and n are integers, respectively.

Figure 9:
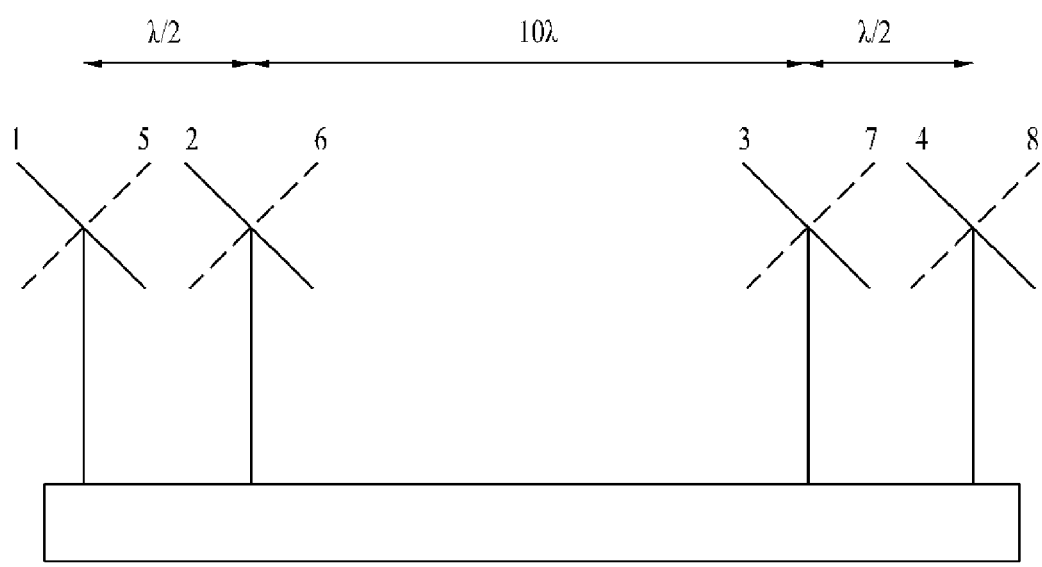

As can be seen from Equation 15, a diagonal term of the codebook W1 is composed of independent matrices, so that a codebook appropriate for more various antenna configurations can be designed. The antenna configuration shown in FIG. 9 will hereinafter be described as an example. FIG. 9 shows an example of the 8Tx cross-polarized (X-pol) antenna configuration. As can be seen from FIG. 9, the 8Tx cross-polarized (X-pol) antenna may be composed of an antenna group having two orthogonal polarities, antennas (antennas 1, 2, 3, 4) of the antenna group 1 have the same polarities (for example, vertical polarization), and antennas (antennas 5, 6, 7, 8) of the antenna group 2 have the same polarity (for example, horizontal polarization). For example, each of a distance between antennas 1 and 2 (or antennas 5 and 6) and a distance between antennas 3 and 4 (or antennas 7 and 8) is a half (i.e., λ/2) of a signal wavelength, and each of a distance between antennas 2 and 3 (or antennas 6 and 7) may be 10 times (10λ) the signal wavelength (λ). In accordance with the 8Tx cross-polarized antenna configuration of FIG. 9, if the spacing between antennas is irregular, it is possible to more efficiently reflect actual channel characteristics using the codebook structure of Equation 15.

The antenna configuration of FIG. 9 is disclosed only for illustrative purposes. The codebook shown in Equation 15 can be applied to various cases (e.g., a distributed antenna system (DAS), and a Coordinated Multi-point (CoMP) communication scheme for data transmission through by cooperation of two or more BSs) in which independent channel characteristics are present between antenna groups due to long spacing between Tx antennas.

As described above, if the spacing between antennas is irregular, correlation between two antenna groups (for example, a vertical polarity group and a horizontal polarity group) may not be defined as one phase value. For example, correlation of the remaining antennas other than the antenna 1 may be denoted by the following equation 16.

$$\begin{bmatrix} u \\ v \\ e^{j\theta_1} u \\ e^{j\theta_2} v \end{bmatrix} \quad \text{[Equation 16]}$$

In Equation 16, each vector (u or v) is a (2×1)-sized vector, and an i-th element of this vector is correlation between antenna 1 and antenna (i) of FIG. 9. For example, the vertical polarity antenna 1 and the horizontal polarity antenna 5 may be co-located, and correlation between antennas may be represented by phase rotation of a specific phase difference $\theta_i$ corresponding to a phase difference between vertical polarity and horizontal polarity. Likewise, since the vertical polarity antenna 2 and the horizontal polarity antenna 6 are co-located, correlation between antennas may be denoted through phase rotation of the phase difference $\theta_i$. In addition, correlation between antenna 1 and antenna 2 within the vertical polarity antenna group has linear phase increment characteristics according to a very short distance (λ2) between two antennas, and may be denoted by a vector (u). Likewise, correlation between antenna 5 and antenna 6 within the horizontal polarity antenna group has linear phase increment characteristics, and may be denoted by a vector (u). As a result, correlation between antenna-1 and each of antenna 1, 2, 5 or 6 may be represented by a first element (u) and a third element $e^{j\theta_1}$ u shown in Equation 16.

Likewise, correlation between vertical polarity antennas 3 and 4 for the antenna 1 or correlation between horizontal polarity antennas 7 and 8 for the antenna 1 may be denoted by a vector (v). In addition, correlation between the vertical polarity antenna 3 and the horizontal polarity antenna 7 that are co-located, or correlation between the vertical polarity antenna 4 and the horizontal polarity antenna 8 that are co-located may be represented by a phase rotation of a phase difference $\theta_2$. As a result, correlation between antenna-1 and each of antenna 3, 4, 7 or 8 may be represented by a second element (v) and a fourth element $e^{j\theta_2}$ v shown in Equation 16.

In this case, an independent channel is generated due to a long distance (10λ) between a group of antennas (1, 2, 5, 6) and a group of antennas (3, 4, 7, 8). In order to correctly reflect such independent channels, upper elements (reflecting channels of the antennas 1, 2, 5, 6) and lower elements (reflecting channels of the antennas 3, 4, 7, 8) contained in the final codeword structure (W1*W2) need to have independent characteristics. For example, according to the codebook structure of Equation 15, an upper matrix and a lower matrix of the final codewords (W1*W2) may have independent bases. Equation 17 exemplarily shows the final codeword (W1*W2) in case of Rank 1 or Rank 2.

$$W1(i) * W2(j) = \begin{cases} = \begin{bmatrix} X_i(k) \\ \alpha_j Y_i(k) \end{bmatrix} & (\text{if rank} = 1) \\ = \begin{bmatrix} X_i(k) & X_i(l) \\ \alpha_j Y_i(k) & \beta_j Y_i(l) \end{bmatrix} & (\text{if rank} = 2) \end{cases} \quad \text{[Equation 17]}$$

In Equation 17, $X_i(j)$ is a j-th column vector of $X_i$, and $Y_i(j)$ is a j-th column vector of $Y_i$. For example, in accordance with the 8Tx antenna configuration, each of $X_i(k)$ and $Y_i(k)$ within the final codeword of Rank 1 is a column vector having a length of 4 (=Nt/2), and $X_i(k)$ and $Y_i(k)$ are independent vectors. As a result, the spacing between one antenna group composed of antennas (1, 2, 5, 6) and another antenna group composed of antennas (3, 4, 7, 8) is very long, such that independent channel characteristics can be correctly reflected to the antenna groups. In addition, a phase difference between antennas 1 and 2 that are co-located, or a phase difference between antennas 5 and 6 that are co-located may be denoted by $\alpha_j$. Alternatively, a phase difference between antennas 3 and 4 that are co-located, or a phase difference between antennas 7 and 8 that are co-located may be denoted by $\alpha_j$. In Equation 17, the final codeword for use in Rank 2 has substantially identical characteristics other than each case using two column vectors. That is, an upper matrix and a lower matrix of the final codeword have independent bases even in the case of Rank 2, so that mutual independent channel characteristics can be correctly represented due to the long spacing between antennas.

In addition, the codebook structures of Equations 15 to 17 can also be equally applied to a case (e.g., an exemplary case has independent channel characteristics because the spacing between some antennas is longer than $\lambda/2$) in which no correlation exists due to long spacing between antennas of the 4Tx antenna configuration. For example, in case of 4Tx Rank 1 [that is, Nt is set to 4 (Nt=4) and the number of columns of the final codeword is set to 1], the final codeword (W1*W2) can be denoted by the following equation 18.

$$W1(i) * W2(j) = \begin{bmatrix} X_i(k) \\ \alpha_j Y_i(k) \end{bmatrix} = \begin{bmatrix} 1 \\ x \\ \alpha_j \begin{bmatrix} 1 \\ y \end{bmatrix} \end{bmatrix} = \begin{bmatrix} 1 \\ x \\ \alpha_j \\ \alpha_j y \end{bmatrix} = \begin{bmatrix} 1 \\ x \\ z \\ y' \end{bmatrix} \quad \text{[Equation 18]}$$

In Equation 18, it can be recognized that respective elements of the final codeword are denoted by independent variables. This means that channel characteristics depending upon various configurations (for example, ULA, cross-polarity, antenna structure having irregular spacing between antennas) of the 4Tx antenna can be reflected.

Various examples of the 4Tx codebook configured to satisfy Equations 15 to 18 will hereinafter be described in detail.

Embodiment 1

A first embodiment (Embodiment 1) shows an example of the codebook structure capable of reflecting channel characteristics depending upon various antenna structures in case of 4Tx Rank 1. The codebook according to the first embodiment can be represented by the following equation 19.

$$W1 = \left\{ \begin{bmatrix} X(i) & 0 \\ 0 & X(i) \end{bmatrix} \Big| i = 1, 2, \ldots, 8 \right\} \cup \quad \text{[Equation 19]}$$

$$\left\{ \begin{bmatrix} \begin{bmatrix} 1 \\ 1 \end{bmatrix} & 0 \\ 0 & \begin{bmatrix} 1 \\ -1 \end{bmatrix} \end{bmatrix}, \begin{bmatrix} \begin{bmatrix} 1 \\ -1 \end{bmatrix} & 0 \\ 0 & \begin{bmatrix} 1 \\ 1 \end{bmatrix} \end{bmatrix} \right\}$$

$$X = \begin{bmatrix} 1 & 1 & 1 & 1 & 1 & 1 & 1 & 1 \\ 1 & e^{j\frac{\pi}{4}} & j & e^{j\frac{3\pi}{4}} & -1 & e^{j\frac{5\pi}{4}} & -j & e^{j\frac{7\pi}{4}} \end{bmatrix}$$

$$W2 = \left\{ \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix} \right\}$$

In Equation 19, W1 is composed of a block diagonal matrix, and may also be composed of 8 codewords having the same diagonal terms and two codewords having different diagonal terms. If the diagonal terms from among the codewords of W1 are identical to each other, each diagonal term X(i) may be composed of an i-th column vector from among the matrix X shown in Equation 19. If W1 and W2 are configured as described above, the final codeword W(W1*W2) for each case can be represented by the following Table 1. Since W1 has 10 codewords and W2 has 4 codewords, a total number of final codewords may be 40 as necessary. In Table 1, $a^T$ is a transpose matrix of the matrix (a), and C is denoted by $C=1/(2\sqrt{5})$.

TABLE 1

| W(1) = |
|---|
| $[0.5 \quad 0.5 \quad 0.5 \quad 0.5]^T$ |
| W(2) = |
| $[0.5 \quad 0.5 \quad -0.5 \quad -0.5]^T$ |
| W(3) = |
| $[0.5 \quad 0.5 \quad -0.5i \quad -0.5i]^T$ |
| W(4) = |
| $[0.5 \quad 0.5 \quad +0.5i \quad +0.5i]^T$ |
| W(5) = |
| $[0.5 \quad -0.5 \quad 0.5 \quad -0.5]^T$ |
| W(6) = |
| $[0.5 \quad -0.5 \quad -0.5 \quad 0.5]^T$ |
| W(7) = |
| $[0.5 \quad -0.5 \quad 0.5i \quad +0.5i]^T$ |
| W(8) = |
| $[0.5 \quad -0.5 \quad 0.5i \quad -0.5i]^T$ |
| W(9) = |
| $[0.5 \quad c+ci \quad 0.5 \quad c+ci]^T$ |
| W(10) = |
| $[0.5 \quad c+ci \quad -0.5 \quad -c-ci]^T$ |
| W(11) = |
| $[0.5 \quad c+ci \quad -0.5i \quad c-ci]^T$ |
| W(12) = |
| $[0.5 \quad c+ci \quad +0.5i \quad -c+ci]^T$ |
| W(13) = |
| $0.5 \quad -c-ci \quad 0.5 \quad -c-ci]^T$ |
| W(14) = |
| $[0.5 \quad -c-ci \quad -0.5 \quad c+ci]^T$ |
| W(15) = |
| $[0.5 \quad -c-ci \quad -0.5i \quad -c+ci]^T$ |
| W(16) = |
| $[0.5 \quad -c-ci \quad +0.5i \quad c-ci]^T$ |
| W(17) = |
| $[0.5 \quad +0.5i \quad 0.5 \quad +0.5i]^T$ |
| W(18) = |
| $[0.5 \quad +0.5i \quad -0.5 \quad -0.5i]^T$ |
| W(19) = |
| $[0.5 \quad +0.5i \quad -0.5i \quad 0.5]^T$ |
| W(20) = |
| $[0.5 \quad +0.5i \quad +0.51 \quad -0.5]^T$ |
| W(21) = |
| $[0.5 \quad -0.5i \quad 0.5 \quad -0.5i]^T$ |

TABLE 1-continued

| | W(22) = | | |
|---|---|---|---|
| [0.5 | −0.5i | −0.5 | +0.5i]$^T$ |
| | W(23) = | | |
| [0.5 | −0.5i | −0.5i | −0.5]$^T$ |
| | W(24) = | | |
| [0.5 | −0.5i | +0.5i | 0.5]$^T$ |
| | W(25) = | | |
| [0.5 | c − ci | 0.5 | c − ci]$^T$ |
| | W(26) = | | |
| [0.5 | c − ci | −0.5 | −c + ci]$^T$ |
| | W(27) = | | |
| [0.5 | c − ci | −0.5i | −c − ci]$^T$ |
| | W(28) = | | |
| [0.5 | c − ci | +0.5i | c + ci]$^T$ |
| | W(29) = | | |
| [0.5 | −c + ci | 0.5 | −c + ci]$^T$ |
| | W(30) = | | |
| [0.5 | −c + ci | −0.5 | c − ci]$^T$ |
| | W(31) = | | |
| [0.5 | −c + ci | −0.5i | c + ci]$^T$ |
| | W(32) = | | |
| [0.5 | −c + ci | +0.5i | −c − ci]$^T$ |
| | W(33) = | | |
| [0.5 | 0.5 | 0.5 | −0.5]$^T$ |
| | W(34) = | | |
| [0.5 | 0.5 | −0.5 | 0.5]$^T$ |
| | W(35) = | | |
| [0.5 | 0.5 | −0.5i | +0.5i]$^T$ |
| | W(36) = | | |
| [0.5 | 0.5 | +0.5i | −0.5i]$^T$ |
| | W(37) = | | |
| [0.5 | −0.5 | 0.5 | 0.5]$^T$ |
| | W(38) = | | |
| [0.5 | −0.5 | −0.5 | −0.5]$^T$ |
| | W(39) = | | |
| [0.5 | −0.5 | −0.5i | −0.5i]$^T$ |
| | W(40) = | | |
| [0.5 | −0.5 | +0.5i | +0.5i]$^T$ |

The final codebook shown in Table 1 includes 40 different codewords. 40 different codewords are configured to satisfy constant modulus characteristics. In addition, the final codebook according to Embodiment 1 includes 16 4Tx closed-loop MIMO codewords defined in the legacy 3GPP LTE Release-8 or Release-9 system, and W2 is defined as 2Tx closed-loop MIMO codewords defined in the legacy 3GPP LTE Release-8 or Release-9 system. In other words, the final codebook according to Embodiment 1 may be composed of a superset of codebooks defined in the legacy 3GPP LTE Release-8 or Release-9 system. Since W1 includes 10 codewords, W1 may be denoted by 4 bits. Since W2 includes 4 codewords, W2 may be denoted by 2 bits.

Embodiment 2

A second embodiment (Embodiment 2) relates to another example of the codebook structure capable of reflecting channel characteristics depending upon various antenna structures in case of 4Tx Rank 1. The codebook according to Embodiment 2 can be represented by the following equation 20.

$$W1 = \left\{ \begin{bmatrix} X(i) & 0 \\ 0 & X(i) \end{bmatrix} \middle| i = 1, 2, \ldots, 4 \right\} \cup \quad \text{[Equation 20]}$$

$$\left\{ \begin{bmatrix} \begin{bmatrix} 1 \\ 1 \end{bmatrix} & 0 \\ 0 & \begin{bmatrix} 1 \\ -1 \end{bmatrix} \end{bmatrix}, \begin{bmatrix} \begin{bmatrix} 1 \\ -1 \end{bmatrix} & 0 \\ 0 & \begin{bmatrix} 1 \\ 1 \end{bmatrix} \end{bmatrix} \right\} \cup$$

$$\left\{ \begin{bmatrix} \begin{bmatrix} 1 \\ 8PSK_7 \end{bmatrix} & 0 \\ 0 & \begin{bmatrix} -j \\ 8PSK_5 \end{bmatrix} \end{bmatrix}, \begin{bmatrix} \begin{bmatrix} 1 \\ 8PSK_5 \end{bmatrix} & 0 \\ 0 & \begin{bmatrix} -j \\ 8PSK_7 \end{bmatrix} \end{bmatrix}, \right.$$

$$\left. \begin{bmatrix} \begin{bmatrix} 1 \\ 8PSK_3 \end{bmatrix} & 0 \\ 0 & \begin{bmatrix} -j \\ 8PSK_1 \end{bmatrix} \end{bmatrix}, \begin{bmatrix} \begin{bmatrix} 1 \\ 8PSK_1 \end{bmatrix} & 0 \\ 0 & \begin{bmatrix} j \\ 8PSK_3 \end{bmatrix} \end{bmatrix} \right\}$$

$$W2 = \left\{ \begin{bmatrix} 1 \\ 1 \end{bmatrix}, \begin{bmatrix} 1 \\ -1 \end{bmatrix} \right\}$$

In Equation 20, W1 is composed of a block diagonal matrix, and may also be composed of 4 codewords having the same diagonal terms and 6 codewords having different diagonal terms. If the diagonal terms from among the codewords of W1 are identical to each other, each diagonal term X(i) may be composed of an i-th column vector from among the matrix X shown in Equation 20. If diagonal terms from among the codewords of W1 are different from each other, a specific component denoted by $8PSK_i$ is $e^{j2\pi i/8}$, for example, $8PSK_1 = e^{j2\pi/8}$, $8PSK_3 = e^{j6\pi/8}$, $8PSK_5 = e^{j10\pi/8}$, $8PSK_7 = e^{j14\pi/8}$. If W1 and W2 are configured as described above, the final codeword W(W1*W2) for each case can be represented by the following Table 2. Since W1 has 10 codewords and W2 has 2 codewords, a total number of final codewords may be 20 as necessary. In Table 2, $a^T$ is a transpose matrix of the matrix (a), and C is denoted by $C = 1/(2\sqrt{2})$.

TABLE 2

| | W(1) = | | |
|---|---|---|---|
| [0.5000 | 0.5000 | 0.5000 | 0.5000]$^T$ |
| | W(2) = | | |
| [0.5000 | 0.5000 | −0.5000 | −0.5000]$^T$ |
| | W(3) = | | |
| [0.5000 | 0.5000i | 0.5000 | 0.5000i]$^T$ |
| | W(4) = | | |
| [0.5000 | 0.5000i | −0.5000 | 0.5000i]$^T$ |
| | W(5) = | | |
| [0.5000 | −0.5000 | 0.5000 | −0.5000]$^T$ |
| | W(6) = | | |
| [0.5000 | −0.5000 | −0.5000 | 0.5000]$^T$ |
| | W(7) = | | |
| [0.5000 | −0.5000i | 0.5000 | −0.5000i]$^T$ |
| | W(8) = | | |
| [0.5000 | −0.5000i | −0.5000 | 0.5000i]$^T$ |
| | W(9) = | | |
| [0.5000 | 0.5000 | 0.5000 | −0.5000]$^T$ |

TABLE 2-continued

W(10) =

[0.5000     0.5000     −0.5000     0.5000]$^T$

W(11) =

[0.5000     −0.5000     0.5000     0.5000]$^T$

W(12) =

[0.5000     −0.5000     −0.5000     −0.5000]$^T$

W(13) =

[0.5000     c − ci     −0.5000i     −c − ci]$^T$

W(14) =

[0.5000     c − ci     0.5000i     c + ci]$^T$

W(15) =

[0.5000     −c − ci     0.5000i     c − ci]$^T$

W(16) =

[0.5000     −c − ci     −0.5000i     −c + ci]$^T$

W(17) =

[0.5000     −c + ci     −0.5000i     c + ci]$^T$

W(18) =

[0.5000     −c + ci     0.5000i     −c − ci]$^T$

W(19) =

[0.5000     c + ci     0.5000i     −c + ci]$^T$

W(20) =

[0.5000     c + ci     −0.5000i     c − ci]$^T$

The final codebook shown in Table 2 includes 20 different codewords. 20 different codewords are configured to satisfy constant modulus characteristics. In addition, the final codebook according to Embodiment 2 includes 16 4Tx closed-loop MIMO codewords defined in the legacy 3GPP LTE Release-8 or Release-9 system. Since W1 includes 10 codewords, W1 may be denoted by 4 bits. Since W2 includes two codewords, W2 may be denoted by 1 bit. The codebook according to Embodiment 2 has a smaller-sized codebook as compared to Embodiment 1 in which W1 is 4 bits long and W2 is 2 bits long. That is, the payload size of the codebook W2 is reduced from two bits to one bit. Accordingly, according to a feedback method for transmitting the codebook W2 for a short-term period, feedback overhead according to Embodiment 2 may be reduced in size as compared to Embodiment 1.

Embodiment 3

A third embodiment (Embodiment 3) relates to one example of the codebook structure capable of reflecting channel characteristics depending upon various antenna structures in case of 4Tx Rank 2. The codebook according to Embodiment 3 can be represented by the following equation 21.

$$W1 = \left\{ \begin{bmatrix} 1 & 1 & 0 & 0 \\ 1 & -1 & 0 & 0 \\ 0 & 0 & 1 & 1 \\ 0 & 0 & 1 & -1 \end{bmatrix}, \begin{bmatrix} 1 & 1 & 0 & 0 \\ j & -j & 0 & 0 \\ 0 & 0 & 1 & 1 \\ 0 & 0 & j & -j \end{bmatrix}, \begin{bmatrix} 1 & 1 & 0 & 0 \\ \frac{1+j}{\sqrt{2}} & -\frac{1+j}{\sqrt{2}} & 0 & 0 \\ 0 & 0 & 1 & 1 \\ 0 & 0 & \frac{1+j}{\sqrt{2}} & -\frac{1+j}{\sqrt{2}} \end{bmatrix}, \begin{bmatrix} 1 & 1 & 0 & 0 \\ \frac{1-j}{\sqrt{2}} & \frac{-1+j}{\sqrt{2}} & 0 & 0 \\ 0 & 0 & 1 & 1 \\ 0 & 0 & \frac{1-j}{\sqrt{2}} & \frac{-1+j}{\sqrt{2}} \end{bmatrix}, \begin{bmatrix} 1 & 1 & 0 & 0 \\ 1 & -1 & 0 & 0 \\ 0 & 0 & 1 & 1 \\ 0 & 0 & -1 & 1 \end{bmatrix} \right\}$$

[Equation 21]

$$W2 = \left\{ \begin{bmatrix} e_2^1 & e_2^1 \\ e_2^1 & -e_2^1 \end{bmatrix}, \begin{bmatrix} e_2^2 & e_2^2 \\ e_2^2 & -e_2^2 \end{bmatrix}, \begin{bmatrix} e_2^1 & e_2^2 \\ e_2^1 & -e_2^2 \end{bmatrix}, \begin{bmatrix} e_2^1 & e_2^2 \\ -e_2^1 & -e_2^2 \end{bmatrix}, \begin{bmatrix} e_2^1 & e_2^2 \\ e_2^1 & e_2^2 \end{bmatrix}, \begin{bmatrix} e_2^1 & e_2^2 \\ je_2^1 & -je_2^2 \end{bmatrix}, \begin{bmatrix} e_2^1 & e_2^2 \\ je_2^1 & je_2^2 \end{bmatrix}, \begin{bmatrix} e_2^1 & e_2^2 \\ -je_2^1 & -je_2^2 \end{bmatrix} \right\}$$

In Equation 21, W1 is composed of a block diagonal matrix, and may also be composed of 4 codewords having the same diagonal terms and only one codeword having different diagonal terms. If W1 and W2 are configured as described above, the final codeword W(W1*W2) for each case can be represented by the following Table 3. Since W1 has 5 codewords and W2 has 8 codewords, a total number of final codewords may be 40 as necessary. In Table 3, a$^T$ is a transpose matrix of the matrix (a), and C is denoted by c=1/(2$\sqrt{2}$).

TABLE 3

W(1) =

[0.5000     0.5000     0.5000     0.5000]$^T$
[0.5000     0.5000     −0.5000     −0.5000]$^T$

W(2) =

[0.5000     −0.5000     0.5000     −0.5000]$^T$
[0.5000     −0.5000     −0.5000     0.5000]$^T$

W(3) =

[0.5000     0.5000     0.5000     0.5000]$^T$
[0.5000     −0.5000     0.5000     −0.5000]$^T$

W(4) =

[0.5000     0.5000     −0.5000     −0.5000]$^T$
[0.5000     −0.5000     −0.5000     0.5000]$^T$

W(5) =

[0.5000     0.5000     0.5000     0.5000]$^T$
[0.5000     −0.5000     −0.5000     0.5000]$^T$

W(6) =

[0.5000     0.5000     0.5000i     0.5000i]$^T$
[0.5000     −0.5000     0.5000i     −0.5000i]$^T$

TABLE 3-continued $W(7) =$
$[0.5000 \quad 0.5000 \quad 0.5000i \quad 0.5000i]^T$
$[0.5000 \quad -0.5000 \quad -0.5000i \quad 0.5000i]^T$ $W(8) =$
$[0.5000 \quad 0.5000 \quad -0.5000i \quad -0.5000i]^T$
$[0.5000 \quad -0.5000 \quad -0.5000i \quad 0.5000i]^T$ $W(9) =$
$[0.5000 \quad c+ci \quad 0.5000 \quad c+ci]^T$
$[0.5000 \quad c+ci \quad -0.5000 \quad -c-ci]^T$ $W(10) =$
$[0.5000 \quad -c-ci \quad 0.5000 \quad -c-ci]^T$
$[0.5000 \quad -c-ci \quad -0.5000 \quad c+ci]^T$ $W(11) =$
$[0.5000 \quad c+ci \quad 0.5000 \quad c+ci]^T$
$[0.5000 \quad -c-ci \quad 0.5000 \quad -c-ci]^T$ $W(12) =$
$[0.5000 \quad c+ci \quad -0.5000 \quad -c-ci]^T$
$[0.5000 \quad -c-ci \quad -0.5000 \quad c+ci]^T$ $W(13) =$
$[0.5000 \quad c+ci \quad 0.5000 \quad c+ci]^T$
$[0.5000 \quad -c-ci \quad -0.5000 \quad c+ci]^T$ $W(14) =$
$[0.5000 \quad c+ci \quad 0.5000i \quad -c+ci]^T$
$[0.5000 \quad -c-ci \quad 0.5000i \quad c-ci]^T$ $W(15) =$
$[0.5000 \quad c+ci \quad 0.5000i \quad -c+ci]^T$
$[0.5000 \quad -c-ci \quad -0.5000i \quad -c+ci]^T$ $W(16) =$
$[0.5000 \quad c+ci \quad -0.5000i \quad c-ci]^T$
$[0.5000 \quad -c-ci \quad -0.5000i \quad -c+ci]^T$ $W(17) =$
$[0.5000 \quad 0.5000i \quad 0.5000 \quad 0.5000i]^T$
$[0.5000 \quad 0.5000i \quad -0.5000 \quad 0.5000i]^T$ $W(18) =$
$[0.5000 \quad -0.5000i \quad 0.5000 \quad -0.5000i]^T$
$[0.5000 \quad -0.5000i \quad -0.5000 \quad 0.5000i]^T$ $W(19) =$
$[0.5000 \quad 0.5000i \quad 0.5000 \quad 0.5000i]^T$
$[0.5000 \quad -0.5000i \quad 0.5000 \quad -0.5000i]^T$ $W(20) =$
$[0.5000 \quad 0.5000i \quad -0.5000 \quad -0.5000i]^T$
$[0.5000 \quad -0.5000i \quad -0.5000 \quad 0.5000i]^T$ $W(21) =$
$[0.5000 \quad 0.5000i \quad 0.5000 \quad 0.5000i]^T$
$[0.5000 \quad -0.5000i \quad -0.5000 \quad 0.5000i]^T$ $W(22) =$
$[0.5000 \quad 0.5000i \quad 0.5000i \quad -0.5000]^T$
$[0.5000 \quad -0.5000i \quad 0.5000i \quad 0.5000]^T$ $W(23) =$
$[0.5000 \quad 0.5000i \quad 0.5000i \quad -0.5000]^T$
$[0.5000 \quad -0.5000i \quad -0.5000i \quad -0.5000]^T$ $W(24) =$
$[0.5000 \quad 0.5000i \quad 0-0.5000i \quad 0.5000]^T$
$[0.5000 \quad -0.5000i \quad 0-0.5000i \quad -0.5000]^T$ $W(25) =$
$[0.5000 \quad c-ci \quad 0.5000 \quad c-ci]^T$
$[0.5000 \quad c-ci \quad -0.5000 \quad -c+ci]^T$ $W(26) =$
$[0.5000 \quad -c+ci \quad 0.5000 \quad -c+ci]^T$
$[0.5000 \quad -c+ci \quad -0.5000 \quad c-ci]^T$ $W(27) =$
$[0.5000 \quad c-ci \quad 0.5000 \quad c-ci]^T$
$[0.5000 \quad -c+ci \quad 0.5000 \quad -c+ci]^T$ $W(28) =$
$[0.5000 \quad c-ci \quad -0.5000 \quad -c+ci]^T$
$[0.5000 \quad -c+ci \quad -0.5000 \quad c-ci]^T$ $W(29) =$
$[0.5000 \quad c-ci \quad 0.5000 \quad c-ci]^T$
$[0.5000 \quad -c+ci \quad -0.5000 \quad c-ci]^T$ $W(30) =$
$[0.5000 \quad c-ci \quad 0.5000i \quad c+ci]^T$
$[0.5000 \quad -c+ci \quad 0.5000i \quad -c-ci]^T$ $W(31) =$
$[0.5000 \quad c-ci \quad 0.5000i \quad c+ci]^T$
$[0.5000 \quad -c+ci \quad -0.5000i \quad c+ci]^T$ $W(32) =$
$[0.5000 \quad c-ci \quad -0.5000i \quad -c-ci]^T$
$[0.5000 \quad -c+ci \quad -0.5000i \quad c+ci]^T$ $W(33) =$
$[0.5000 \quad 0.5000 \quad 0.5000 \quad -0.5000]^T$
$[0.5000 \quad 0.5000 \quad -0.5000 \quad 0.5000]^T$ $W(34) =$
$[0.5000 \quad -0.5000 \quad 0.5000 \quad 0.5000]^T$
$[0.5000 \quad -0.5000 \quad -0.5000 \quad -0.5000]^T$ $W(35) =$
$[0.5000 \quad 0.5000 \quad 0.5000 \quad -0.5000]^T$
$[0.5000 \quad -0.5000 \quad 0.5000 \quad 0.5000]^T$ $W(36) =$
$[0.5000 \quad 0.5000 \quad -0.5000 \quad 0.5000]^T$
$[0.5000 \quad -0.5000 \quad -0.5000 \quad -0.5000]^T$ $W(37) =$
$[0.5000 \quad 0.5000 \quad 0.5000 \quad -0.5000]^T$
$[0.5000 \quad -0.5000 \quad -0.5000 \quad -0.5000]^T$ $W(38) =$
$[0.5000 \quad 0.5000 \quad 0.5000i \quad -0.5000i]^T$
$[0.5000 \quad -0.5000 \quad 0.5000i \quad 0.5000i]^T$ $W(39) =$
$[0.5000 \quad 0.5000 \quad 0.5000i \quad -0.5000i]^T$
$[0.5000 \quad -0.5000 \quad -0.5000i \quad -0.5000i]^T$ $W(40) =$
$[0.5000 \quad 0.5000 \quad -0.5000i \quad 0.5000i]^T$
$[0.5000 \quad -0.5000 \quad -0.5000i \quad -0.5000i]^T$ The final codebook shown in Table 3 includes 40 different codewords. 40 different codewords are configured to satisfy constant modulus characteristics. In addition, the final codebook according to Embodiment 3 includes 16 4Tx closed-loop MIMO codewords defined in the legacy 3GPP LTE Release-8 or Release-9 system. Therefore, the codebook according to Embodiment 3 may be composed of a superset of codebooks defined in the legacy 3GPP LTE Release-8 or Release-9 system. Since W1 includes 5 codewords, W1 may be denoted by 3 bits. Since W2 includes 8 codewords, W2 may be denoted by 3 bits.

Embodiment 4

A fourth embodiment (Embodiment 4) relates to a method for defining the codebook structure in a different way from Equation 15 and supporting a variety of antenna structures. In accordance with the codebooks W1 and W2 of Embodiment 4, an i-th codeword W1(i) of the codebook W1 and a j-th codeword W2(j) of the codebook W2 can be represented by the following equation 22.

$$W1(i) = \begin{bmatrix} X_i & 0 \\ 0 & X_i \end{bmatrix}$$ [Equation 22]

$$W2(j) = \overbrace{\begin{bmatrix} e_m^{k1} & e_M^{l1} & \ldots & e_M^{n1} \\ \alpha_j e_M^{k2} & \beta_j e_M^{l2} & \ldots & \gamma_j e_M^{n2} \end{bmatrix}}^{r\ columns} (\text{if rank} = r)$$

In Equation 22, W1 may be defined as a block diagonal matrix, respective blocks are the same matrices, and one block ($X_i$) may be defined as (Nt/2)×M-sized matrix. In Equation 13, Nt is the number of Tx antennas. W2 is defined as a (2M×r)-sized matrix, and r is a transmission rank value (i.e., the number of layers). In case of W2, $e_M^p$ (p=k1, k2, l1, l2, ..., n1, n2) is a (M×1)-sized vector. A p-th component from among M vector components is denoted by 1, and the remaining components are zero vectors. If $e_M^p$ is multiplied by W1, a p-th column from among W1 columns is selected, so that this vector may be referred to as a selection vector. In case of an upper selection vector (for example, $e_M^{k}1$) and a lower selection vector (for example, $\alpha_j e_M^{k}2$) of the codebook W2, the positions of individual elements (i.e., k1 and k2) each having the value of 1 are different from each other. In case of W2, $\alpha_j$, $\beta_j$, and $\gamma_j$ denote predetermined phase values, respectively. In Equation 22, k1, k2, l1, l2, n1, n2 may be 1≤k1, k2, l1, l2, n1 n2≤M, where k1, k2, l1, l2, n1 and n2 are integers, respectively.

The result of comparison between the codebook structure of Equation 15 and the codebook structure of Equation 22 will hereinafter be described. In accordance with the codebook structure of Equation 15, diagonal terms of the codebook W1 may be composed of independent matrices (i.e., $X_i$ and $Y_i$), and the same columns are selected from each of $X_i$ and $Y_i$ of the codebook W1 by the codebook W2 in such a manner that an upper matrix and a lower matrix of the final codeword (W=W1*W2) are configured (for example, an upper matrix of W is designed in a manner that a k-th column vector of the block $X_i$ of the codebook W1 is selected by $e_M^k$ of the codebook W2 and a k-th column vector of the block $Y_i$ of the codebook W1 is selected by $\alpha_j e_M^k$ of the codebook W2), resulting in implementation of a flexible codebook structure in which the final codeword can reflect channel characteristics of various antenna structures. In accordance with the codebook structure of Equation 22 according to Embodiment 4, diagonal terms of W1 are identical to each other (i.e., $X_i$ and $X_i$), different columns of the block $X_i$ of the codebook W1 are selected by W2, and an upper matrix and a lower matrix of the final codeword (W=W1*W2) are designed in a manner that a k1-th column vector of the block $X_i$ of the codebook W1 is selected by $e_M^k1$ of the codebook W2 and a k2-th column vector of the block $Y_i$ of the codebook W1 is selected by $\alpha_j e_M^k2$ of the codebook W2, resulting in implementation of a flexible codebook structure in which the final codeword can reflect channel characteristics of various antenna structures. In case of designing the codebook according to the above-mentioned principles, a more general codebook including a variety of codewords suitable for all the 4Tx antenna structures may be constructed as an example.

Embodiment 5

A fifth embodiment (Embodiment 5) relates to a method for defining the codebook structure in a different way from Equation 15 or 22 and supporting a variety of antenna structures. In accordance with the codebooks W1 and W2 of Embodiment 5, an i-th codeword W1(i) of the codebook W1 and a j-th codeword W2(j) of the codebook W2 can be represented by the following equation 23.

$$W1(i) = \begin{bmatrix} X_i & 0 \\ 0 & Y_i \end{bmatrix}$$ [Equation 23]

$$W2(j) = \overbrace{\begin{bmatrix} e_m^{k1} & e_M^{l1} & \ldots & e_M^{n1} \\ \alpha_j e_M^{k2} & \beta_j e_M^{l2} & \ldots & \gamma_j e_M^{n2} \end{bmatrix}}^{r\ columns} (\text{if rank} = r)$$

In Equation 23, W1 may be defined as a block diagonal matrix. In this case, a diagonal term of the block diagonal matrix may be composed of independent matrices $X_i$ and $Y_i$. Each of $X_i$ and $Y_i$ may be defined as (Nt/2)×M-sized matrix (where Nt is the number of Tx antennas). W2 is defined as (2M×r)-sized matrix, and r is a transmission rank value (i.e., the number of layers). In case of W2, $e_M^p$) (p=k1, k2, l1, l2, ..., n1, n2) is a (M×1)-sized vector. A p-th component from among M vector components is denoted by 1, and the remaining components are zero vectors. If $e_M^p$ is multiplied by W1, a p-th column from among W1 columns is selected, so that this vector may be referred to as a selection vector. In case of an upper selection vector (for example, $e_M^k1$) and a lower selection vector (for example, $\alpha_j e_M^k2$) of the codebook W2, the positions of individual elements (i.e., k1 and k2) each having the value of 1 are different from each other. In case of W2, $\alpha_j$, $\beta_j$, and $\gamma_j$ denote predetermined phase values, respectively. In Equation 23, k1, k2, l1, l2, n1, n2 may be 1≤k1, k2, l1, l2, n1 n2≤M, where k1, k2, l1, l2, n1, n2 are integers, respectively.

The codebook structure of Equation 23 is obtained by combining the codebook structure of Equation 15 with some characteristics of the codebook structure of Equation 22. In the codebook structure of Equation 23, diagonal terms of the codebook W1 are independently constructed (i.e., $X_i$ and $Y_i$), different columns are selected from each of $X_i$ and $Y_i$ of the codebook W1 by the codebook W2 in such a manner that an upper matrix and a lower matrix of the final codeword (W=W1*W2) are configured (for example, an upper matrix of W is designed in a manner that a k1-th column vector of the block $X_i$ of the codebook W1 is selected by $e_M^k1$ of the codebook W2 and a k2-th column vector of the block $Y_i$ of the codebook W1 is selected by $\alpha_j e_M^k2$ of the codebook W2), resulting in implementation of a flexible codebook structure in which the final codeword can reflect channel characteristics of various antenna structures.

Embodiment 6

A sixth embodiment (Embodiment 6) relates to a method for defining the codebook structure in a different way from Equation 22 or 23 and supporting a variety of antenna structures. In accordance with the codebooks W1 and W2 of Embodiment 6, an i-th codeword W1(i) of the codebook W1 and a j-th codeword W2(j) of the codebook W2 can be represented by the following equation 24.

$$W1(i) = \begin{bmatrix} X_i & 0 \\ 0 & X_i \end{bmatrix}$$ [Equation 24]

-continued $$W2(j) = \begin{bmatrix} \overbrace{\tilde{e}_M^k \quad \tilde{e}_M^l \quad \cdots \quad \tilde{e}_M^n}^{r\ columns} \\ \alpha_j \tilde{e}_M^k \quad \beta_j \tilde{e}_M^l \quad \cdots \quad \gamma_j \tilde{e}_M^n \end{bmatrix}$$

(if rank = r)

In Equation 24, W1 may be defined as a block diagonal matrix, respective blocks are the same matrices, and one block ($X_i$) may be defined as (Nt/2)×M-sized matrix. In Equation 24, Nt is the number of Tx antennas. W2 is defined as (2M×r)-sized matrix, and r is a transmission rank value (i.e., the number of layers). In case of W2, $\tilde{e}_M^p$ (p=k, l, ..., n) is conceptually different from $e_M^p$ indicating the selection vector shown in the aforementioned equations. In case of W2, $\tilde{e}_M^p$ is a (M×1)-sized vector, and is a coefficient for constructing linear combination of column vectors of the matrix $X_i$ of the codebook W1. For example, $\tilde{e}_M^p$ may be denoted by $\tilde{e}_M^p = [c_1\ c_2\ c_3\ c_4]^T$, where $c_1, c_2, c_3,$ or $c_4$ is a complex number. In case of W2, $\alpha_j, \beta_j,$ and $\gamma_j$ denote predetermined phase values, respectively. In Equation 24, k, l, n are integers, respectively. For example, the final codeword (W=W1*W2) can be represented by the following equation 25.

$$W = \begin{bmatrix} \sum_{n=1}^{4} c_n X_i(n) & \alpha_j \sum_{n=1}^{4} c_n X_i(n) \end{bmatrix}^T \quad \text{[Equation 25]}$$

The codebook structure of Equation 24 can effectively reflect channel characteristics of the cross-polarized antenna configuration. For example, in Equation 25, $$\sum_{n=1}^{4} c_n X_i(n)$$

may be an element for reflecting channel characteristics of a certain antenna group (for example, a vertical polarity antenna group), and $$\alpha_j \sum_{n=1}^{4} c_n X_i(n)$$

may be an element for reflecting channel characteristics of another antenna group (for example, a horizontal polarity antenna group). The final codeword W is generated by W1 and W2. In case of W1, $X_i$ may be composed of M column vectors close to long term correlation (i.e., reflecting long term correlation) between antennas contained in a single antenna group (i.e., a vertical polarity antenna group or a horizontal polarity antenna group). In other words, when singular value decomposition is performed on a channel matrix formed by one antenna group, M column vectors close to a dominant right singular vector may construct $X_i$ indicating a diagonal term of the codebook W1. $\tilde{e}_M^p$ of the codebook W2 is obtained by performing linear combination of two or more column vectors from among M column vectors, and a phase value (for example, $\alpha_j$) of a lower vector of the codebook W2 indicates correlation between a vertical polarity antenna group and a horizontal polarity antenna group. In other words, coefficients for constructing the $\tilde{e}_M^p$ value of the codebook W2 can be determined in a manner that some linear combination vectors from among M column vectors contained in the block $X_i$ of the codebook W1 become vectors close to an instant channel (i.e., reflecting an instant channel). In this case, a coefficient value of linear combination of column vectors can be transmitted for a short term. For example, the coefficient value of linear combination of column vectors can be frequently fed back.

An example of the codebook structure for 4Tx Rank 1 according to the codebook structure of Equation 24 will hereinafter be described in detail. The codebook according to this example can be defined by the following equation 26.

$$W1\left\{ \begin{bmatrix} X(i:i+1) & 0 \\ 0 & X(i:i+1) \end{bmatrix} \middle| i = 1, 3, 5, 7 \right\}, \quad \text{[Equation 26]}$$

$$X = \begin{bmatrix} 1 & 1 & 1 & 1 & 1 & 1 & 1 & 1 \\ 1 & e^{j\frac{\pi}{4}} & j & e^{j\frac{3\pi}{4}} & -1 & e^{j\frac{5\pi}{4}} & -j & e^{j\frac{7\pi}{4}} \end{bmatrix}$$

$$W2 = \left\{ \begin{bmatrix} \tilde{e}_M^m \\ \alpha_n \tilde{e}_N^m \end{bmatrix} \middle| m = 1, 2, 3, 4, n = 1, 2, 3, 4 \right\},$$

where $\tilde{e}_M^1 = \begin{bmatrix} 1 \\ 1 \end{bmatrix}, \tilde{e}_M^2 = \begin{bmatrix} 1 \\ -1 \end{bmatrix},$ $\tilde{e}_M^3 = \begin{bmatrix} 1 \\ -j \end{bmatrix}, \tilde{e}_M^4 = \begin{bmatrix} 1 \\ j \end{bmatrix}$ and $\alpha_1 = 1, \alpha_2 = -1, \alpha_3 = j, \alpha_4 = -j.$ In Equation 26, W1 is composed of block diagonal matrices, and may be composed of the matrices X(i:i+1) having the same diagonal terms. X(i:i+1) is a matrix composed of an i-th column and an (i+1)-th column from among the X matrix of Equation 26. For example, if 'i' is set to 1, X(i:i+1) is $$\begin{bmatrix} 1 & 1 \\ 1 & e^{j\frac{\pi}{4}} \end{bmatrix}.$$

If 'i' is set to 3, X(i:i+1) is $$\begin{bmatrix} 1 & 1 \\ j & e^{j\frac{3\pi}{4}} \end{bmatrix}.$$

If 'i' is set to 5, X(i:i+1) is $$\begin{bmatrix} 1 & 1 \\ -1 & e^{j\frac{5\pi}{4}} \end{bmatrix}.$$

If 'i' is set to 7, X(i:i+1) is $$\begin{bmatrix} 1 & 1 \\ -j & e^{j\frac{7\pi}{4}} \end{bmatrix}.$$

As a result, W1 includes four codewords.

In Equation 26, W2 has 16 different codewords according to m and n values, as shown in the following Table 4. In Table 4, $a^T$ is a transpose matrix of the matrix (a).

TABLE 4

| m | n=1 | n=2 | n=3 | n=4 |
|---|---|---|---|---|
| 1 | $[1\ 1\ 1\ 1]^T$ | $[1\ 1\ -1\ -1]^T$ | $[1\ 1\ j\ j]^T$ | $[1\ 1\ -j\ -j]^T$ |
| 2 | $[1\ -1\ 1\ -1]^T$ | $[1\ -1\ -1\ 1]^T$ | $[1\ -1\ j\ -j]^T$ | $[1\ -1\ -j\ j]^T$ |
| 3 | $[1\ -j\ 1\ -j]^T$ | $[1\ -j\ -1\ j]^T$ | $[1\ -j\ j\ 1]^T$ | $[1\ -j\ -j\ -1]^T$ |
| 4 | $[1\ j\ 1\ j]^T$ | $[1\ j\ -1\ -j]^T$ | $[1\ j\ j\ -1]^T$ | $[1\ j\ -j\ 1]^T$ |

If W1 and W2 are configured as shown in Equation 26, the final codeword W(W1*W2) for each case can be represented by the following Table 5. W1 has four codewords, and W2 has 16 codewords. The number of final codewords other than the overlapped codewords from among 64 codewords caused by a combination of W1 and W2 may be 52. In the following Table 5, $a^T$ is a transpose matrix of the matrix (a), and c is denoted by $c=1/(2\sqrt{2})$.

TABLE 5

W(1) = $[2c\quad 0\quad 2c\quad 0]^T$

W(2) = $[2c\quad 0\quad -2c\quad 0]^T$

W(3) = $[2c\quad 0\quad 0\quad +2ci]^T$

W(4) = $[2c\quad 0\quad 0\quad -2ci]^T$

W(5) = $[0\quad 2c\quad 0\quad 2c]^T$

W(6) = $[0\quad 2c\quad 0\quad -2c]^T$

W(7) = $[0\quad 2c\quad 0\quad +2ci]^T$

W(8) = $[0\quad 2c\quad 0\quad -2ci]^T$

W(9) = $[c-ci\quad c+ci\quad c-ci\quad c+ci]^T$

W(10) = $[c-ci\quad c+ci\quad -c+ci\quad -c-ci]^T$

W(11) = $[c-ci\quad c+ci\quad c+ci\quad -c+ci]^T$

W(12) = $[c-ci\quad c+ci\quad -c-ci\quad c-ci]^T$

W(13) = $[c+ci\quad c-ci\quad c+ci\quad c-ci]^T$

W(14) = $[c+ci\quad c-ci\quad -c-ci\quad -c+ci]^T$

W(15) = $[c+ci\quad c-ci\quad -c+ci\quad c+ci]^T$

W(16) = $[c+ci\quad c-ci\quad c-ci\quad -c-ci]^T$

W(17) = $[0\quad 0.5000+0.5000i\quad 0\quad 0.5000+0.5000i]^T$

W(18) = $[0\quad 0.5000+0.5000i\quad 0\quad -0.5000-0.5000i]^T$

W(19) = $[0\quad 0.5000+0.5000i\quad 0\quad -0.5000+0.5000i]^T$

TABLE 5-continued

W(20) = $[0\quad 0.5000+0.5000i\quad 0\quad 0.5000-0.5000i]^T$

W(21) = $[c-ci\quad +0.5000i\quad c-ci\quad +0.5000i]^T$

W(22) = $[c-ci\quad +0.5000i\quad -c+ci\quad -0.5000i]^T$

W(23) = $[c-ci\quad +0.5000i\quad c+ci\quad -0.5000]^T$

W(24) = $[c-ci\quad +0.5000i\quad -c-ci\quad 0.5000]^T$

W(25) = $[c+ci\quad 0.5000\quad c+ci\quad 0.5000]^T$

W(26) = $[c+ci\quad 0.5000\quad -c+ci\quad -0.5000]^T$

W(27) = $[c+ci\quad 0.5000\quad -c+ci\quad +0.5000i]^T$

W(28) = $[c+ci\quad 0.5000\quad c-ci\quad -0.5000i]^T$

W(29) = $[0\quad +2ci\quad 0\quad +2ci]^T$

W(30) = $[0\quad +2ci\quad 0\quad -2ci]^T$

W(31) = $[0\quad +2ci\quad 0\quad -2c]^T$

W(32) = $[0\quad +2ci\quad 0\quad 2c]^T$

W(33) = $[c-ci\quad -c+ci\quad c-ci\quad -c+ci]^T$

W(34) = $[c-ci\quad -c+ci\quad -c+ci\quad c-ci]^T$

W(35) = $[c-ci\quad -c+ci\quad c+ci\quad -c-ci]^T$

W(36) = $[c-ci\quad -c+ci\quad -c-ci\quad c+ci]^T$

W(37) = $[c+ci\quad c+ci\quad c+ci\quad c+ci]^T$

W(38) = $[c+ci\quad c+ci\quad -c-ci\quad -c-ci]^T$

W(39) = $[c+ci\quad c+ci\quad -c+ci\quad -c+ci]^T$

W(40) = $[c+ci\quad c+ci\quad c-ci\quad c-ci]^T$

W(41) = $[0\quad -0.5000+0.5000i\quad 0\quad -0.5000+0.5000i]^T$

W(42) = $[0\quad -0.5000+0.5000i\quad 0\quad 0.5000-0.5000i]^T$

W(43) = $[0\quad -0.5000+0.5000i\quad 0\quad -0.5000-0.5000i]^T$

W(44) = $[0\quad -0.5000+0.5000i\quad 0\quad 0.5000+0.5000i]^T$

W(45) = $[c-ci\quad -0.5000\quad c-ci\quad -0.5000]^T$

TABLE 5-continued

| W(46) = | | | |
|---|---|---|---|
| $[c - ci$ | $-0.5000$ | $-c + ci$ | $0.5000]^T$ |
| W(47) = | | | |
| $[c - ci$ | $-0.5000$ | $c + ci$ | $-0.5000i]^T$ |
| W(48) = | | | |
| $[c - ci$ | $-0.5000$ | $-c - ci$ | $+0.5000i]^T$ |
| W(49) = | | | |
| $[c + ci$ | $+0.5000i$ | $c + ci$ | $+0.5000i]^T$ |
| W(50) = | | | |
| $[c + ci$ | $+0.5000i$ | $-c - ci$ | $-0.5000i]^T$ |
| W(51) = | | | |
| $[c + ci$ | $+0.5000i$ | $-c + ci$ | $-0.5000]^T$ |
| W(52) = | | | |
| $[c + ci$ | $+0.5000i$ | $c - ci$ | $0.5000]^T$ |

The final codebook according to Embodiment 6 shown in Table 1 is composed of 52 different codewords, and 32 codewords from among 52 different codewords are configured to satisfy constant modulus characteristics. In addition, the final codebook according to Embodiment 6 includes 12 codewords from among 16 4Tx closed-loop MIMO codewords defined in the legacy 3GPP LTE Release-8 or Release-9 system. Since W1 includes 4 codewords, W1 may be denoted by 2 bits. Since W2 includes 16 codewords, W2 may be denoted by 4 bits.

Figure 10:
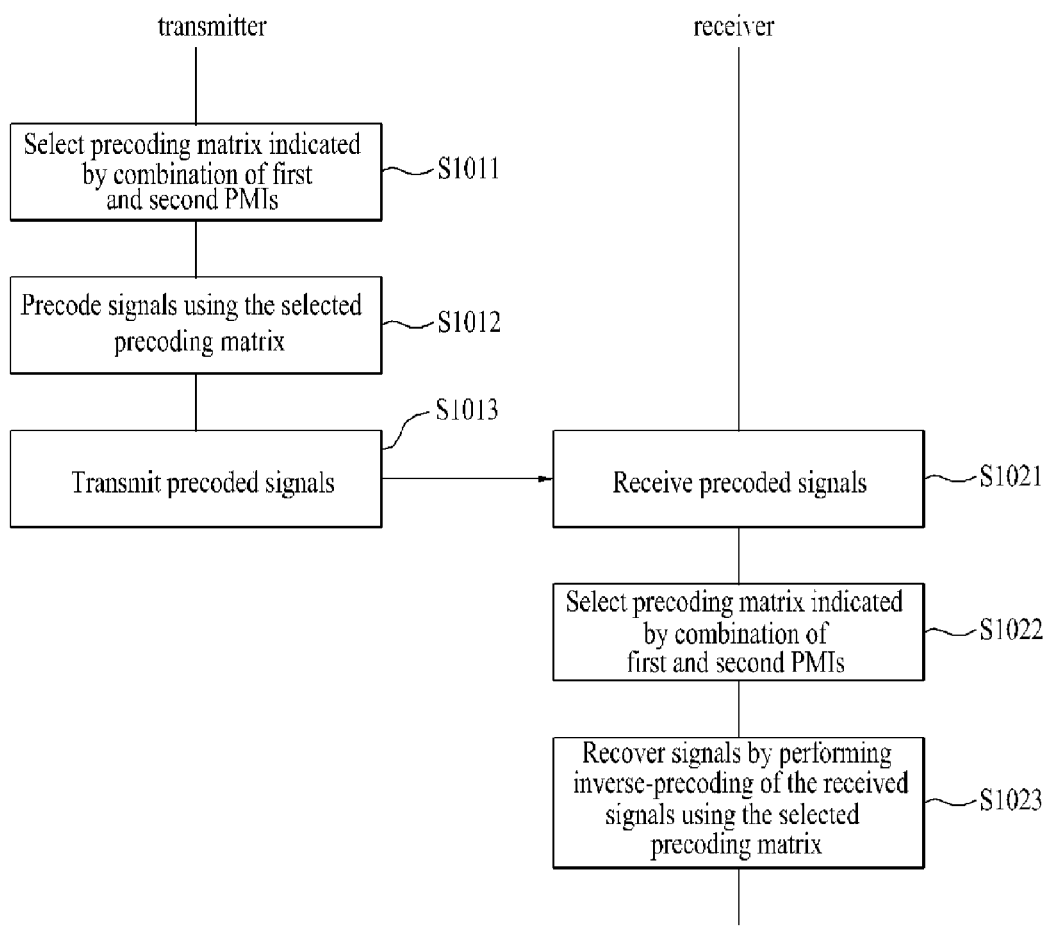
FIG. 10 is a flowchart illustrating a method for transmitting/receiving precoded signals according to one example of the present invention.

FIG. 10 is a flowchart illustrating a method for transmitting/receiving precoded signals according to one example of the present invention.

Referring to FIG. 10, in step S1011, the transmitter determines a first matrix from among the first codebook including a plurality of precoding matrices indicated by a first PMI, and determines a second matrix from among a second codebook including a plurality of precoding matrices indicated by a second PMI, so that it can determine the precoding matrix on the basis of the first matrix and the second matrix. If a precoding matrix indicated by a combination of the first PMI and the second PMI is selected as described above, the first PMI and the second PMI are fed back from the receiver, and the receiver may determine the first PMI and the second PMI by measuring a channel received from the transmitter so that it can feed back the determined PMIs. Alternatively, the first PMI and the second PMI may be properly selected by the transmitter in consideration of PMIs fed back from the receiver. That is, in the case where a first matrix from a first codebook is determined on the basis of a first PMI and a second PMI from the second codebook is determined on the basis of a second PMI, this means that the first and second PMIs fed back from the receiver are used without change and are properly selected from among the first and second codebooks in consideration of the first and second PMIs fed back from the receiver by the transmitter.

In step S1012, the transmitter can perform precoding of signals to be transmitted to the receiver using the selected precoding matrix. In step S1013, the transmitter can transmit the precoded signals to the receiver using Nt transmission antennas.

In step S1021, the receiver can receive signals from the transmitter. In step S1022, the receiver can select the precoding matrix indicated by a combination of the first PMI and the second PMI. The precoding matrix information (for example, first and second PMIs) may be given by the transmitter. In step S1023, the receiver can recover signals by performing inverse precoding of the received signals using the selected precoding matrix.

As described above, the precoding matrix (W) applied to precoding or inverse-precoding processing by the transmitter and the receiver may be determined by a product of a first matrix W1($i$) indicated by a first PMI from among matrices contained in the first codebook (for example, W1 codebook) and a second matrix W2($j$) indicated by a second PMI from among matrices contained in the second codebook (for example, W2 codebook).

Each precoding matrix contained in the first codebook is defined as a block diagonal matrix, and diagonal terms (i.e., blocks) of the block diagonal matrix may be configured separately from each other. For example, an i-th precoding matrix W1($i$) from among the precoding matrices contained in the first codebook is a (Nt×2M)-sized block diagonal matrix (where Nt is the number of Tx antennas of the transmitter), each block is a (Nt/2)×M-sized matrix, and respective blocks may be identical to or different from each other.

Each precoding matrix contained in the second codebook may be composed of an upper element and a lower element, and the lower element may include a phase rotation value. For example, a j-th precoding matrix W2($j$) from among the precoding matrices contained in the second codebook may be defined as a (2M×r)-sized matrix (where r=the number of layers (i.e., a transmission rank value)). For example, the upper element or the lower element may be composed of a selection vector that is capable of selecting the same columns from among W1 ($i$) blocks, and the lower element may be obtained by multiplying a predetermined phase rotation value by the upper element. Alternatively, the upper element or the lower element may be composed of a selection vector capable of selecting different columns from among W1($i$) blocks, and the lower element may be obtained by multiplying a predetermined phase rotation value by the upper element. Alternatively, the upper element or the lower element may be a coefficient for constructing a linear combination of at least one column from among W1($i$) blocks, or may be obtained by multiplying a predetermined phase rotation value by the upper element.

In order to construct matrices contained in the first codebook (W1 codebook) and the second codebook (W2 codebook) using the method for transmitting and receiving precoded signals shown in FIG. 10, the specific configurations of the transmitter and the receiver may be implemented such that the various embodiments of the present invention are performed independently or two or more embodiments of the present invention are performed simultaneously. Redundant matters will not be described herein for clarity.

In FIG. 10, the transmitter may be a BS and the receiver may be a UE, or the transmitter may be a UE and the receiver may be a BS. In addition, the operation of the transmitter may also be applied to a relay node (RN) acting as a DL transmission entity, or the operation of the receiver may also be applied to a relay node (RN) acting as a DL reception entity.

Figure 11:
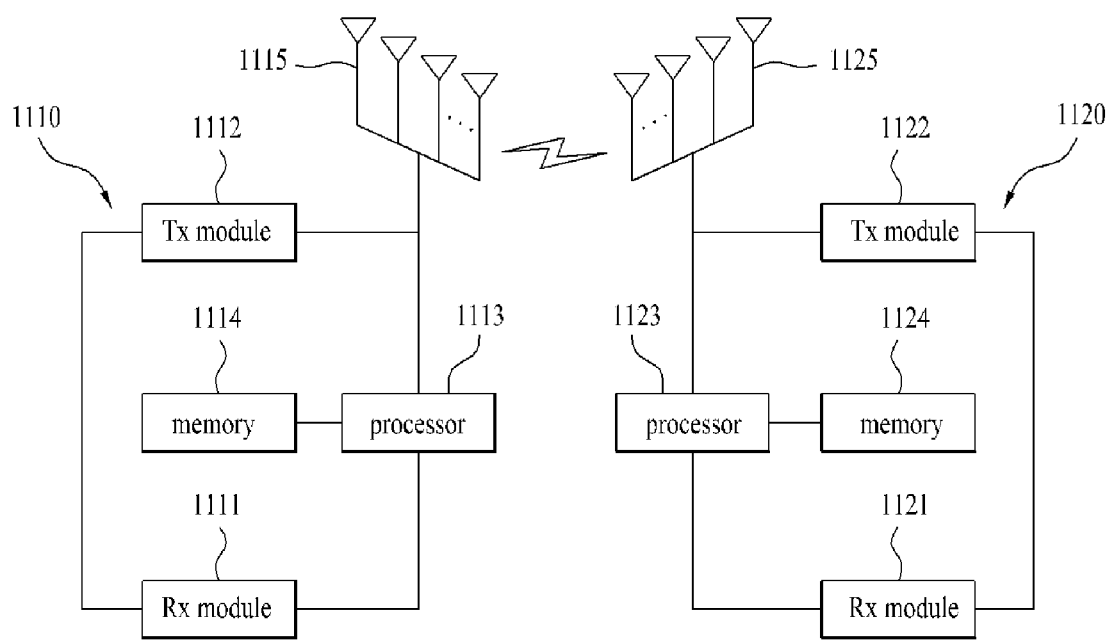
FIG. 11 is a block diagram illustrating a transmitter and a receiver according to embodiments of the present invention.

FIG. 11 is a block diagram illustrating a transmitter and a receiver according to embodiments of the present invention.

Referring to FIG. 11, a transmitter 1110 may include a reception (Rx) module 1111, a transmission (Tx) module 1112, a processor 1113, a memory 1114, and a plurality of antennas 1115. The plurality of antennas 1115 may be contained in the transmitter supporting MIMO transmission and reception. The processor 1113 may provide overall control to the transmitter 1110.

The transmitter 1110 according to one embodiment of the present invention may be constructed to transmit precoded signals to the receiver. The transmitter may include Nt antennas 1115, and may store codebooks (i.e., first and second codebooks) used for selecting the precoding matrix in the memory 1114.

The processor 1113 of the transmitter 1110 may select a precoding matrix indicated by a combination of the first PMI and the second PMI. For example, the processor 1113 of the transmitter determines a first matrix from among the first codebook including a plurality of precoding matrices indicated by a first PMI, and determines a second matrix from among a second codebook including a plurality of precoding matrices indicated by a second PMI, so that it can determine the precoding matrix on the basis of the first matrix and the second matrix. If the processor 1113 selects a precoding matrix indicated by a combination of the first PMI and the second PMI, the first PMI and the second PMI are fed back from the receiver, and the receiver may determine the first PMI and the second PMI by measuring a channel received from the transmitter so that it can feed back the determined PMIs. Alternatively, the first PMI and the second PMI may be properly selected by the processor 1113 in consideration of PMIs fed back from the receiver. That is, provided that the processor 1113 determines a first matrix from a first codebook on the basis of a first PMI and determines a second PMI from the second codebook on the basis of a second PMI, this means that the first and second PMIs fed back from the receiver are used without change and are properly selected from among the first and second codebooks in consideration of the first and second PMIs fed back from the receiver.

The processor 1113 may be configured to perform precoding of at least one layer mapped to a signal to be transmitted using the selected precoding matrix. In addition, the processor 1113 may transmit the precoded signals to the Tx module 1112 through Nt antennas 1115.

The processor 1113 of the transmitter 1110 processes information received at the transmitter 1110 and transmission information. The memory 1114 may store the processed information for a predetermined time. The memory 1114 may be replaced with a component such as a buffer (not shown).

Referring to FIG. 11, the receiver 1120 may include a reception (Rx) module 1121, a transmission (Tx) module 1122, a processor 1123, a memory 1124, and a plurality of antennas 1125. The plurality of antennas 1125 may be contained in the receiver supporting MIMO transmission and reception. The processor 1123 may provide overall control to the receiver 1120.

The receiver 1120 according to one embodiment of the present invention may be constructed to receive precoded signals from the transmitter 1110 including Nt Tx antennas. The receiver 1120 may store codebooks (i.e., first and second codebooks) used for selecting the precoding matrix in the memory 1124. The processor 1123 of the receiver 1120 may be configured to transmit a first PMI and a second PMI to the transmitter 1110 through the Tx module 1122. In this case, the processor 1123 may receive the precoded signals from the transmitter 1110 through the Rx module 1121. The precoding matrix applied to the precoding execution of the transmitter may be selected using the first and second PMIs transmitted from the receiver 1120, or may be properly selected by the transmitter 1110 in consideration of the first and second PMIs transmitted from the receiver 1120. In addition, the processor 1123 may be configured to select a precoding matrix indicated by a combination of the first PMI and the second PMI. The transmitter 1110 may provide information regarding the precoding matrix selected by the processor 1123 of the receiver. In addition, the processor 1123 may be configured to recover signals by performing inverse precoding of the received signals using the selected precoding matrix.

The processor 1123 of the receiver 1120 processes information received at the receiver 1120 and transmission information. The memory 1124 may store the processed information for a predetermined time. The memory 1124 may be replaced with a component such as a buffer (not shown).

The first codebook and the second codebook applied to the transmitter 1110 and the receiver 1120 can be configured as follows.

Each precoding matrix contained in the first codebook is defined as a block diagonal matrix, and diagonal terms (i.e., blocks) of the block diagonal matrix may be configured separately from each other. For example, an i-th precoding matrix $W1(i)$ from among the precoding matrices contained in the first codebook is a (Nt×2M)-sized block diagonal matrix (where Nt is the number of Tx antennas of the transmitter), each block is a (Nt/2)×M-sized matrix, and respective blocks may be identical to or different from each other.

Each precoding matrix contained in the second codebook may be composed of an upper element and a lower element, and the lower element may include a phase rotation value. For example, a j-th precoding matrix $W2(j)$ from among the precoding matrices contained in the second codebook may be defined as a (2M×r)-sized matrix (where r=the number of layers (i.e., a transmission rank value)). For example, the upper element or the lower element may be composed of a selection vector that is capable of selecting the same columns from among $W1(i)$ blocks, and the lower element may be obtained by multiplying a predetermined phase rotation value by the upper element. Alternatively, the upper element or the lower element may be composed of a selection vector capable of selecting different columns from among $W1(i)$ blocks, and the lower element may be obtained by multiplying a predetermined phase rotation value by the upper element. Alternatively, the upper element or the lower element may be a coefficient for constructing a linear combination of at least one column from among $W1(i)$ blocks, or may be obtained by multiplying a predetermined phase rotation value by the upper element.

In order to construct matrices contained in the first codebook (W1 codebook) and the second codebook (W2 codebook) using the transmitter and the receiver shown in FIG. 11, the specific configurations of the transmitter and the receiver may be implemented such that the various embodiments of the present invention are performed independently or two or more embodiments of the present invention are performed simultaneously. Redundant matters will not be described herein for clarity.

In FIG. 11, the transmitter may be a BS and the receiver may be a UE, or the transmitter may be a UE and the receiver may be a BS. In addition, the operation of the transmitter may also be applied to a relay node (RN) acting as a DL transmission entity, or the operation of the receiver may also be applied to a relay node (RN) acting as a DL reception entity.

The above-described embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention are applicable to a variety of mobile communication systems. It will be apparent to those skilled in the art that various modifications and variations can be made to the present invention without departing from the spirit or scope of the invention. Therefore, the above-mentioned detailed description must be considered only for illustrative purposes instead of restrictive purposes. The scope of the present invention must be decided based upon a rational analysis of the claims, and all modifications within the equivalent range of the present invention are within the scope of the present invention.

The invention claimed is:

1. A method for transmitting a precoded signal by a transmitter in a wireless communication system supporting Multiple Input Multiple Output (MIMO) transmission, the method comprising:
   determining a first matrix (W1) from a first codebook including precoding matrices indicated by a first precoding matrix index (PMI);
   determining a second matrix (W2) from a second codebook including precoding matrices indicated by a second PMI;
   determining a precoding matrix (W) on the basis of the first matrix (W1) and the second matrix (W2);
   performing precoding of at least one layer mapped to a signal to be transmitted using the determined precoding matrix (W); and
   transmitting the precoded signal to the receiver,
   wherein each precoding matrix contained in the first codebook comprises a block diagonal matrix,
   wherein individual blocks of the block diagonal matrix are configured independently of each other,
   wherein each precoding matrix contained in the second codebook comprises an upper element and a lower element, where the lower element includes a phase rotation value, and
   wherein:
      an i-th precoding matrix W1($i$) from among precoding matrices contained in the first codebook and a j-th precoding matrix W2($j$) from among precoding matrices contained in the second codebook are represented by the following equation:

$$W1(i) = \begin{bmatrix} X_i & 0 \\ 0 & Y_i \end{bmatrix} \quad \text{[Equation]}$$

$$W2(j) = \begin{bmatrix} e_M^k & e_M^l & \cdots & e_M^n \\ \alpha_j e_M^k & \beta_j e_M^l & \cdots & \gamma_j e_M^n \end{bmatrix},$$

where W1($i$) is a (Nt×2M)-sized block diagonal matrix, Xi and Yi are individual blocks of the block diagonal matrix, each of Xi and Yi is a (Nt/2)×M-sized matrix, and Nt is the number of transmission antennas of the transmitter,
where W2($j$) is a (2M×r)-sized matrix, r is the number of the layers, $e_M^p$ (p=k, l, . . . , n) is a (M×1)-sized vector, a p-th component from among M vector components of $e_M^p$ is set to 1, the remaining components other than the p-th component are set to "0", $e_M^k, e_M^l, \ldots, e_M^n$ denote the upper elements, $\alpha_j e_M^k, \beta_j e_M^l, \ldots, \gamma_j e_M^n$ denote the lower elements, and $\alpha_j, \beta_j, \gamma_j$ denote the phase rotation values, and
where k, l, n are 1≤k, l, n≤M, and k, l, and n are integers, respectively.

2. A method for receiving a precoded signal by a receiver in a wireless communication system supporting Multiple Input Multiple Output (MIMO) transmission, the method comprising:
   receiving a precoded signal obtained by precoding of at least one layer mapped to a signal transmitted from the transmitter, from the transmitter; and
   processing the precoded signal using a precoding matrix (W) determined on the basis of:
      a first matrix (W1) from a first codebook including precoding matrices indicated by a first precoding matrix index (PMI); and
      second matrix (W2) from a second codebook including precoding matrices indicated by a second PMI,
   wherein each precoding matrix contained in the first codebook comprises a block diagonal matrix,
   wherein individual blocks of the block diagonal matrix are configured independently of each other,
   wherein each precoding matrix contained in the second codebook comprises an upper element and a lower element, where the lower element includes a phase rotation value, and
   wherein:
      an i-th precoding matrix W1($i$) from among precoding matrices contained in the first codebook and a j-th precoding matrix W2($j$) from among precoding matrices contained in the second codebook are represented by the following equation:

$$W1(i) = \begin{bmatrix} X_i & 0 \\ 0 & Y_i \end{bmatrix}$$ [Equation]

$$W2(j) = \begin{bmatrix} e_M^k & e_M^l & \cdots & e_M^n \\ \alpha_j e_M^k & \beta_j e_M^l & \cdots & \gamma_j e_M^n \end{bmatrix}$$

where W1($i$) is a (Nt×2M)-sized block diagonal matrix, Xi and Yi are individual blocks of the block diagonal matrix, each of Xi and Yi is a (Nt/2)×M-sized matrix, and Nt is the number of transmission antennas of the transmitter, where W2($j$) is a (2M×r)-sized matrix, r is the number of the layers, $e_M^p$ (p=k, l, ..., n) is a (M×1)-sized vector, a p-th component from among M vector components of $e_M^p$ is set to 1, the remaining components other than the p-th component are set to "0", $e_M^k, e_M^l, \ldots, e_M^n$ denote the upper elements, $\alpha_j e_M^k, \beta_j e_M^l, \ldots, \gamma_j e_M^n$ denote the lower elements, and $\alpha_j, \beta_j, \gamma_j$ denote the phase rotation values, and where k, l, n are 1≤k, l, n≤M, and k, l, and n are integers, respectively.

3. A transmitter for transmitting a precoded signal in a wireless communication system supporting Multiple Input Multiple Output (MIMO) transmission, the transmitter comprising:

a transmission (Tx) module configured to transmit a signal to a receiver; and a processor for controlling the transmitter including the transmission (Tx) module, the processor configured to:

determine a first matrix (W1) from a first codebook including precoding matrices indicated by a first precoding matrix index (PMI);

determine a second matrix (W2) from a second codebook including precoding matrices indicated by a second PMI;

determine a precoding matrix (W) on the basis of the first matrix (W1) and the second matrix (W2);

perform precoding of at least one layer mapped to a signal to be transmitted using the determined precoding matrix (W); and transmit the precoded signal to the receiver through the transmission (Tx) module, wherein each precoding matrix contained in the first codebook comprises a block diagonal matrix, wherein individual blocks of the block diagonal matrix are configured independently of each other, wherein each precoding matrix contained in the second codebook comprises an upper element and a lower element, where the lower element includes a phase rotation value, and wherein:

an i-th precoding matrix W1($i$) from among precoding matrices contained in the first codebook and a j-th precoding matrix W2($j$) from among precoding matrices contained in the second codebook are represented by the following equation:

$$W1(i) = \begin{bmatrix} X_i & 0 \\ 0 & Y_i \end{bmatrix}$$ [Equation]

$$W2(j) = \begin{bmatrix} e_M^k & e_M^l & \cdots & e_M^n \\ \alpha_j e_M^k & \beta_j e_M^l & \cdots & \gamma_j e_M^n \end{bmatrix},$$

where W1($i$) is a (Nt×2M)-sized block diagonal matrix, Xi and Yi are individual blocks of the block diagonal matrix, each of Xi and Yi is a (Nt/2)×M-sized matrix, and Nt is the number of transmission antennas of the transmitter, and where W2($j$) is a (2M×r)-sized matrix, r is the number of the layers, $e_M^p$ (p=k, l, ..., n) is a (M×1)-sized vector, a p-th component from among M vector components of $e_M^p$ is set to 1, the remaining components other than the p-th component are set to "0", $e_M^k, e_M^l, \ldots, e_M^n$ denote the upper elements, $\alpha_j e_M^k, \beta_j e_M^l, \ldots, \gamma_j e_M^n$ denote the lower elements, and $\alpha_j, \beta_j, \gamma_j$ denote the phase rotation values, where k, l, n are 1≤k, l, n≤M, and k, l, and n are integers, respectively.

4. A receiver for receiving a precoded signal in a wireless communication system supporting Multiple Input Multiple Output (MIMO) transmission, the receiver comprising:

a reception (Rx) module configured to receive a signal from a transmitter; and a processor configured to:

control the receiver including the reception (Rx) module;

receive a precoded signal obtained by precoding of at least one layer mapped to a signal transmitted from the transmitter, from the transmitter through the reception (Rx) module; and process the precoded signal using a precoding matrix (W) determined on the basis of:

a first matrix (W1) from a first codebook including precoding matrices indicated by a first precoding matrix index (PMI); and a second matrix (W2) from a second codebook including precoding matrices indicated by a second PMI, wherein each precoding matrix contained in the first codebook comprises a block diagonal matrix, wherein individual blocks of the block diagonal matrix are configured independently of each other, wherein each precoding matrix contained in the second codebook comprises an upper element and a lower element, where the lower element includes a phase rotation value, and wherein:

an i-th precoding matrix W1($i$) from among precoding matrices contained in the first codebook and a j-th precoding matrix W2($j$) from among precoding matrices contained in the second codebook are represented by the following equation:

$$W1(i) = \begin{bmatrix} X_i & 0 \\ 0 & Y_i \end{bmatrix}$$ [Equation]

$$W2(j) = \begin{bmatrix} e_M^k & e_M^l & \cdots & e_M^n \\ \alpha_j e_M^k & \beta_j e_M^l & \cdots & \gamma_j e_M^n \end{bmatrix},$$

where W1($i$) is a (Nt×2M)-sized block diagonal matrix, Xi and Yi are individual blocks of the block diagonal matrix, each of Xi and Yi is a (Nt/2)×M-sized matrix, and Nt is the number of transmission antennas of the transmitter, where W2($j$) is a (2M×r)-sized matrix, r is the number of the layers, $e_M^p$ (p=k, l, ..., n) is a (M×1)-sized vector, a p-th component from among M vector components of $e_M^p$ is set to 1, the remaining components other than the p-th component are set to "0", $e_M^k, e_M^l, \ldots, e_M^n$ denote the upper elements, $\alpha_j e_M^k, \beta_j e_M^l, \ldots, \gamma_j e_M^n$ denote the lower elements, and $\alpha_j, \beta_j, \gamma_j$ denote the phase rotation values, and where k, l, n are $1 \leq k, l, n \leq M$, and k, l, and n are integers, respectively.

* * * * *